(12) United States Patent
Kinoshita

(10) Patent No.: US 8,391,637 B2
(45) Date of Patent: Mar. 5, 2013

(54) IMAGE PROCESSING DEVICE AND IMAGE PROCESSING METHOD

(75) Inventor: Hiroyuki Kinoshita, Tokyo (JP)

(73) Assignee: Sony Corporation, Tokyo (JP)

( * ) Notice: Subject to any disclaimer, the term of this patent is extended or adjusted under 35 U.S.C. 154(b) by 792 days.

(21) Appl. No.: 12/544,530

(22) Filed: Aug. 20, 2009

(65) Prior Publication Data

US 2010/0074520 A1    Mar. 25, 2010

(30) Foreign Application Priority Data

Sep. 25, 2008  (JP) ................. 2008-246792

(51) Int. Cl.
 *G06K 9/40*  (2006.01)
 *G06K 9/00*  (2006.01)
 *G06K 9/46*  (2006.01)

(52) U.S. Cl. ........ 382/275; 382/167; 382/232; 382/254; 382/255

(58) Field of Classification Search .............. 382/167, 382/232, 254, 255, 275
See application file for complete search history.

(56) References Cited

U.S. PATENT DOCUMENTS

| 6,822,758 | B1 | 11/2004 | Morino | |
| 2003/0169944 | A1* | 9/2003 | Dowski et al. | 382/279 |
| 2006/0256226 | A1* | 11/2006 | Alon et al. | 348/335 |

FOREIGN PATENT DOCUMENTS

| JP | 2000-92318 | 3/2000 |
| JP | 2003-18407 | 1/2003 |
| JP | 2003-78812 | 3/2003 |
| JP | 2005-130241 | 5/2005 |
| JP | 2005-354610 | 12/2005 |
| JP | 2007-206738 | 8/2007 |
| JP | 2007-280551 | 10/2007 |
| JP | 2008-147981 | 6/2008 |
| JP | 2009-89082 | 4/2009 |

\* cited by examiner

*Primary Examiner* — Amir Alavi
*Assistant Examiner* — Kenny Cese
(74) *Attorney, Agent, or Firm* — Oblon, Spivak, McClelland, Maier & Neustadt, L.L.P.

(57) ABSTRACT

Tap coefficients of a filter include one reference tap coefficient having a maximum value that is applied to a pixel of interest in a pixel signal array, and negative tap coefficients having negative values that are applied to surrounding pixels around the pixel of interest located in an image height direction. In a tap coefficient array in which the tap coefficients to be applied to pixel signals located sequentially in the image height direction are sequentially arranged, the reference tap coefficient is positioned off center at a position other than the center of the tap coefficients. Among the negative tap coefficients located on both sides of the reference tap coefficient in the tap coefficient array, the number of the negative tap coefficient on a first side is one, and the number of the negative tap coefficients on a second side is two or more.

11 Claims, 16 Drawing Sheets

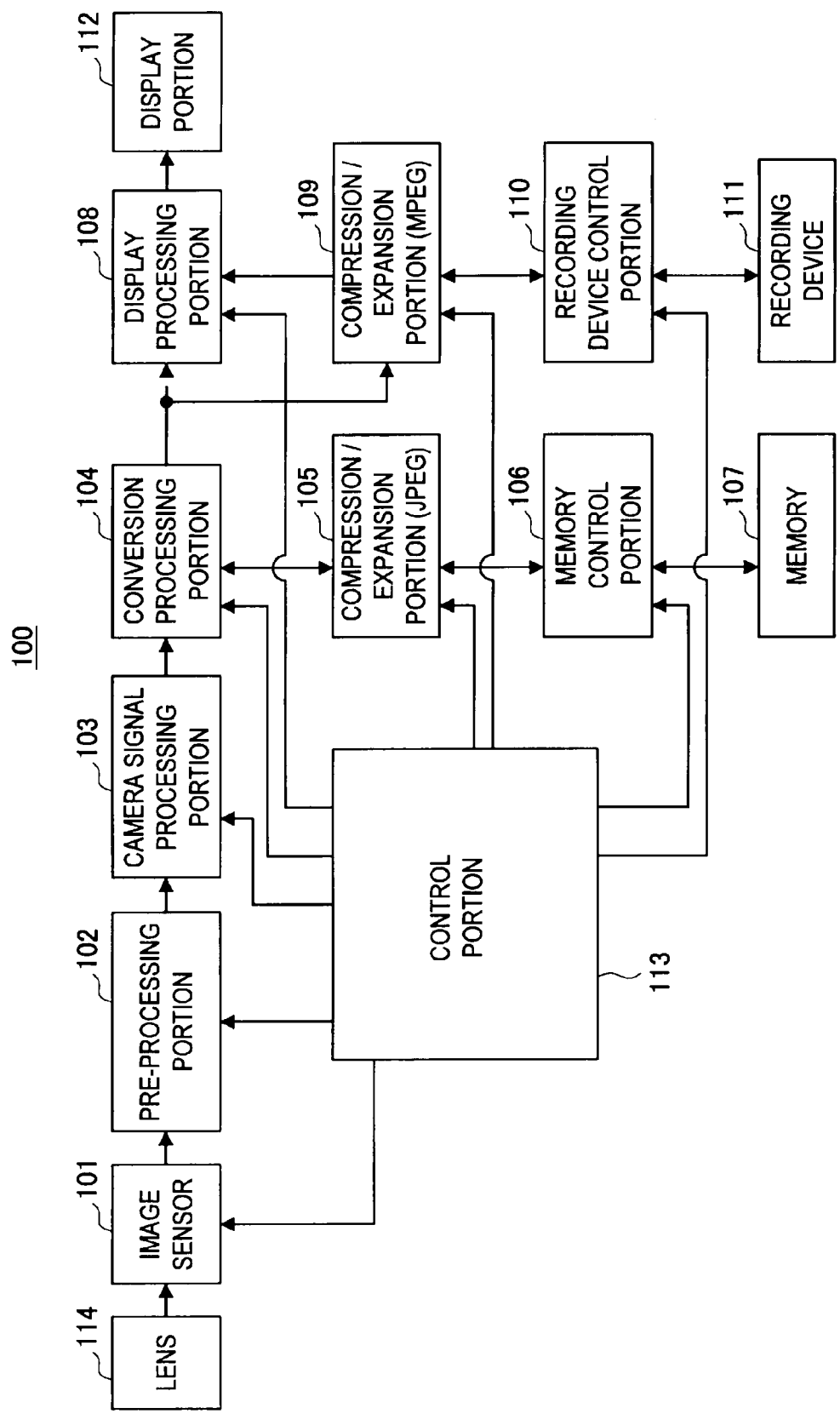

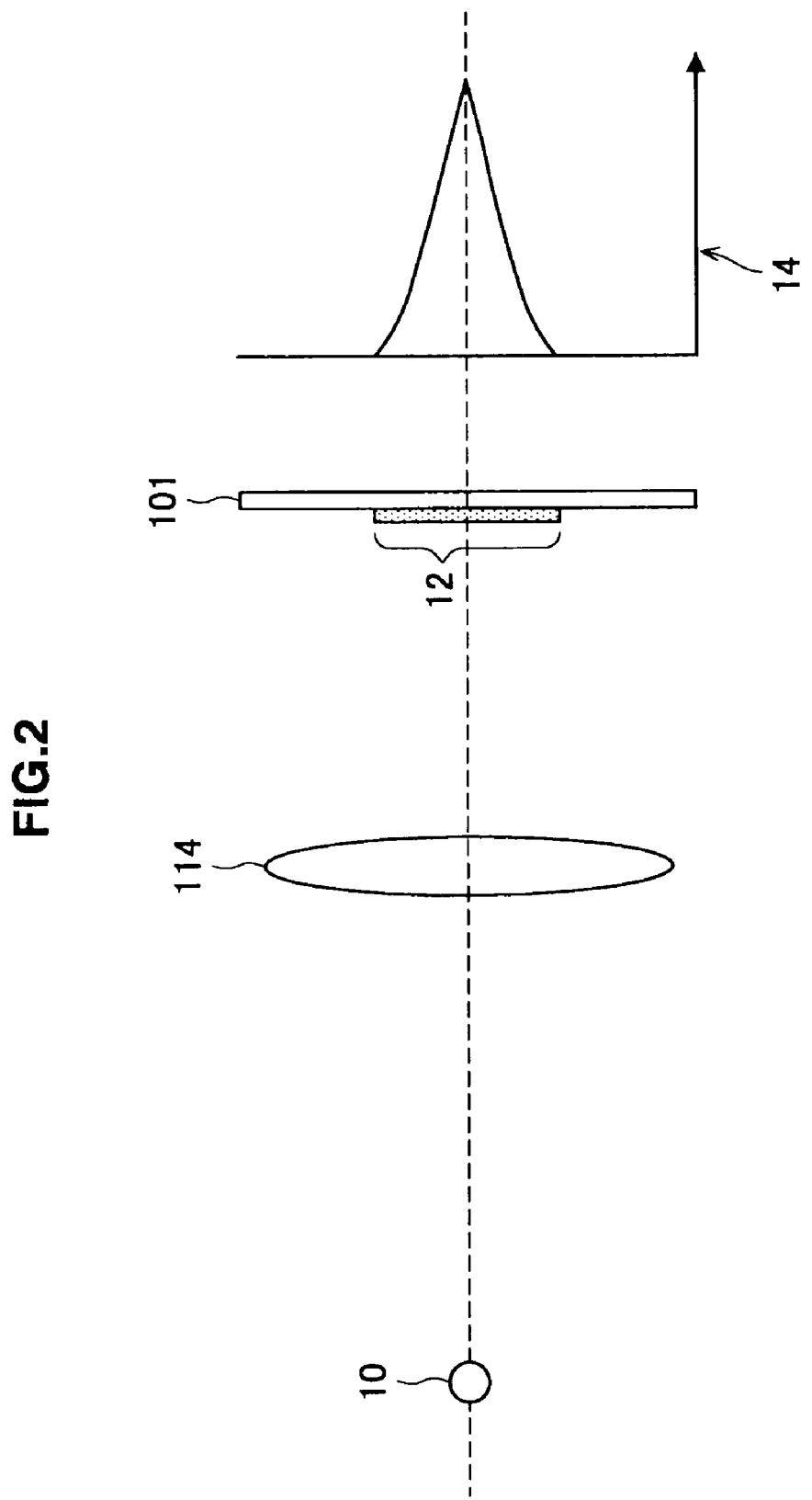

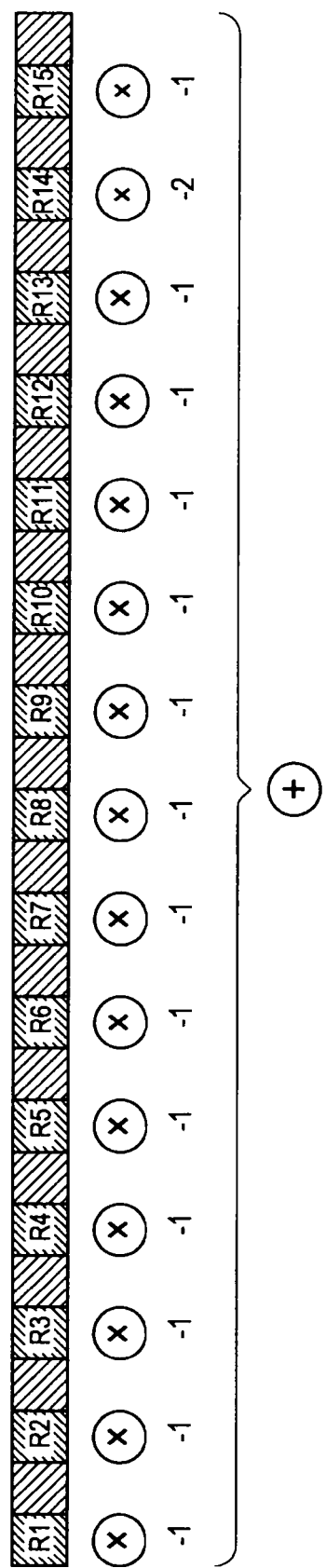

IMAGE PROCESSING DEVICE AND IMAGE PROCESSING METHOD

BACKGROUND OF THE INVENTION

1. Field of the Invention

The present invention relates to an image processing device and an image processing method.

2. Description of the Related Art

It is known that, in imaging devices such as still cameras and video cameras, light transmitted through a lens is affected by a point spread function (PSF) associated with each color, which causes point images to spread. Further, the degree of dispersion of the PSF increases as an image height increases. Note that the image height is a value that expresses, for example, the image position on an imaging surface of an imaging element as a distance from an optical axis.

FIG. 3A to FIG. 3C are graphs each showing a point spread function. The graph in FIG. 3A shows the PSF on the optical axis. The graph in FIG. 3B shows the PSF of the image height 50%. The graph in FIG. 3C shows the PSF of the image height 100%. The chain line indicates a green component, the solid line indicates a red component, and the broken line indicates a blue component. In FIG. 3A to FIG. 3C, the horizontal axis represents the position in an image height direction and the vertical axis represents light intensity.

As shown in FIG. 3A to FIG. 3C, the PSF of each color has the characteristics that, as the image height increases, magnification chromatic aberration increases and at the same time, the spread (hereinafter also referred to as "PSF distortion") in a flared portion of the PSF shape increases. Further, in the examples shown in FIG. 3A to FIG. 3C, the flared portion spreads and elongates to the right. In this manner, the PSF distortion has an asymmetrical shape in the image height direction, and one-sided blur occurs.

FIG. 4A is a graph showing an example of a PSF in which one-sided blur does not occur. FIG. 4B is a graph showing an example of a PSF in which one-sided blur does occur. The chain line indicates a green component, the solid line indicates a red component, and the broken line indicates a blue component. In FIG. 4A, one-sided blur does not occur in the red component (R), the blue component (B) and the green component (G), and coloring due to the one-sided blur does not occur.

In comparison with the PSF of FIG. 4A, the one-sided blur occurs in the red component (R) and the blue component (B) in the PSF of FIG. 4B. In addition, there is an area in which the pixel level of the red component (R) or the blue component (B) exceeds the pixel level of the green component (G) (the area enclosed by the ellipse in FIG. 4B). As a result, a color (purple), which ideally should not appear, appears on an imaging surface of an imaging element, and the color that should not appear is applied to a subject image. A false color on the fringe etc. is generated because of the above-described reason, and thus image quality deteriorates.

Note that the direction in which the one-sided blur occurs (for example, whether it occurs on the right side or occurs on the left side) varies depending on lens characteristics, focus, zoom and exposure states.

A method for correcting PSF distortion is disclosed in Japanese Patent Application Publication No. JP-A-2000-92318, for example. In order to correct the PSF distortion, for example, a deconvolution method such as that described in Japanese Patent Application Publication No. JP-A-2000-92318 has been proposed. Further, Japanese Patent Application Publication No. JP-A-2003-18407 discloses a technology that eliminates color bleeding at image edges.

SUMMARY OF THE INVENTION

When one-sided blur occurs in a state where magnification chromatic aberration is occurring as shown in FIG. 3A to FIG. 3C, the color that is generated by coloring varies depending on whether the coloring occurs before or after the correction of the magnification chromatic aberration. FIG. 5A is a graph showing an example of the PSF before the magnification chromatic aberration correction. FIG. 5B is a graph showing an example of the PSF after the magnification chromatic aberration correction. FIG. 5A shows an example in which one-sided blur occurs in the state where the magnification chromatic aberration is occurring. There is an area in which the pixel level of the red component (R) or the blue component (B) exceeds the pixel level of the green component (G) (the area enclosed by the ellipse in FIG. 5A). As a result, purple coloring occurs, although purple is a color that ideally should not appear. On the other hand, FIG. 5B shows an example after the magnification chromatic aberration has been corrected for the state where the magnification chromatic aberration was occurring. In the area in which the pixel level of the red component (R) or the blue component (B) exceeds the pixel level of the green component (G), blue coloring occurs. In this manner, the color that is generated by coloring due to the one-sided blur varies depending on whether the coloring occurs before or after the magnification chromatic aberration correction. As a result, in some cases, differences in vision may emphasize unnaturalness.

In the image blur correction method (deconvolution method) described in, for example, Japanese Patent Application Publication No. JP-A-2000-92318, it is not assumed that the image blur correction is realized by hardware or the like. For example, the processing volume is too large, and there is a problem in terms of the operation volume and the processing time. Further, in any documents other than JP-A-2000-92318, a discussion about the image blur correction that can be realized by hardware or the like has not been performed. More specifically, a discussion about how to process which pixel using hardware or software, by focusing attention on individual pixel, has not been performed in order to correct image blur.

Further, in approximate edge enhancement processing described in Japanese Patent Application Publication No. JP-A-2003-18407, a specific filter coefficient is not disclosed. For example, if a general edge enhancement filter coefficient (−1, 2, −1) is used, it is possible to reduce bleeding between different colors, but PSF distortion cannot be corrected. As a result, image blur cannot be corrected.

To address the above-described problems, the present invention provides an image processing device and an image processing method that are new and improved and that are capable of simply reducing, at pixel level, generation of a color that should not appear in a subject image due to the influence of a PSF.

According to an embodiment of the present invention, there is provided an image processing device that includes: a pixel signal extraction portion that extracts from image data a pixel signal array formed of pixel signals of a plurality of pixels located in an image height direction, separately for each color component; a filter processing portion that applies a filter having a plurality of tap coefficients corresponding to the number of pixels in the pixel signal array to the extracted pixel signal array, and generates a correction signal array; and a signal array addition portion that adds the generated correction signal array to the pixel signal array, and generates a processed signal array. The plurality of tap coefficients include one reference tap coefficient having a maximum value that is applied to a pixel of interest in the pixel signal array, and negative tap coefficients having negative values that are applied to surrounding pixels around the pixel of interest located in the image height direction. In a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients.

Among the negative tap coefficients located on both sides of the reference tap coefficient in the tap coefficient array, the number of the negative tap coefficient on a first side may be one, and the number of the negative tap coefficients on a second side may be two or more.

When a point image intensity distribution occurs with its peak at a position of the pixel of interest among the plurality of pixels located in the image height direction, and when pixel values on a first side of the pixel of interest decrease moderately compared to pixel values on a second side, among the negative tap coefficients located on both sides of the reference tap coefficient in the tap coefficient array, the number of the negative tap coefficient on a side corresponding to the first side of the pixel of interest may be one, and the number of negative coefficients on a side corresponding to the second side of the pixel of interest may be two or more.

As the manner in which the pixel values decrease becomes more moderate, among the negative tap coefficients located on the both sides of the reference tap coefficient in the tap coefficient array, it may be determined that the number of the negative tap coefficients on the side corresponding to the second side of the pixel of interest is increased.

Among the negative tap coefficients located on both sides of the reference tap coefficient in the tap coefficient array, the number of the negative tap coefficients on one of a first side and a second side may vary corresponding to the image height.

Furthermore, according to another embodiment of the present invention, there is provided an image processing device that includes: a pixel signal extraction portion that extracts from image data a pixel signal array formed of pixel signals of a plurality of pixels located in an image height direction, separately for each color component; a first filter processing portion that applies a first filter having a plurality of tap coefficients corresponding to the number of pixels in the pixel signal array to the extracted pixel signal array, and generates a first correction signal array; a second filter processing portion that applies a second filter having a plurality of tap coefficients corresponding to the number of pixels in the pixel signal array to the extracted pixel signal array, and generates a second correction signal array; a signal array synthesis portion that synthesizes the first correction signal array and the second correction signal array, and generates a synthesized correction signal array; and a signal array addition portion that adds the generated synthesized correction signal array to the pixel signal array, and generates a processed signal array. The plurality of tap coefficients of each of the first filter and the second filter include one reference tap coefficient having a maximum value that is applied to a pixel of interest in the pixel signal array, and negative tap coefficients having negative values that are applied to surrounding pixels around the pixel of interest located in the image height direction. In a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients. The position at which the reference tap coefficient of the first filter is positioned off center and the position at which the reference tap coefficient of the second filter is positioned off center are on opposite sides.

The position at which the reference tap coefficient of the first filter is positioned off center and the position at which the reference tap coefficient of the second filter is positioned off center may be determined independently from each other.

The signal array synthesis portion may compare the first correction signal array and the second correction signal array and adopt one of the correction signal arrays that has a larger absolute value of a signal value, and may generate the synthesized correction signal array.

Furthermore, according to another embodiment of the present invention, there is provided an image processing method that includes the steps of: extracting from image data a pixel signal array formed of pixel signals of a plurality of pixels located in an image height direction, separately for each color component; applying a filter having a plurality of tap coefficients corresponding to the number of pixels in the pixel signal array to the extracted pixel signal array, and generating a correction signal array; and adding the generated correction signal array to the pixel signal array, and generating a processed signal array. The plurality of tap coefficients include one reference tap coefficient having a maximum value that is applied to a pixel of interest in the pixel signal array, and negative tap coefficients having negative values that are applied to surrounding pixels around the pixel of interest located in the image height direction. In a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients.

Furthermore, according to another embodiment of the present invention, there is provided an image processing method that includes the steps of: extracting from image data a pixel signal array formed of pixel signals of a plurality of pixels located in an image height direction, separately for each color component; applying a first filter having a plurality of tap coefficients corresponding to the number of pixels in the pixel signal array to the extracted pixel signal array, and generating a first correction signal array; applying a second filter having a plurality of tap coefficients corresponding to the number of pixels in the pixel signal array to the extracted pixel signal array, and generating a second correction signal array; synthesizing the first correction signal array and the second correction signal array, and generating a synthesized correction signal array; and adding the generated synthesized correction signal array to the pixel signal array, and generating a processed signal array. The plurality of tap coefficients of each of the first filter and the second filter include one reference tap coefficient having a maximum value that is applied to a pixel of interest in the pixel signal array, and negative tap coefficients having negative values that are applied to surrounding pixels around the pixel of interest located in the image height direction. In a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients. The position at which the reference tap coefficient of the first filter is positioned off center and the position at which the reference tap coefficient of the second filter is positioned off center are on opposite sides.

According to the embodiments of the present invention, it is possible to simply reduce, at pixel level, generation of a color that should not appear in a subject image due to the influence of a PSF.

BRIEF DESCRIPTION OF THE DRAWINGS

FIG. 1 is a block diagram showing an imaging device according to a first embodiment of the present invention;

FIG. 2 is an explanatory diagram illustrating a relationship between a point light source, a lens, a point image on an image sensor, and a PSF;

FIG. 12 is an explanatory diagram illustrating a relationship between pixels in a Bayer array and a tap coefficient;

DETAILED DESCRIPTION OF EMBODIMENT

Figure 3A:
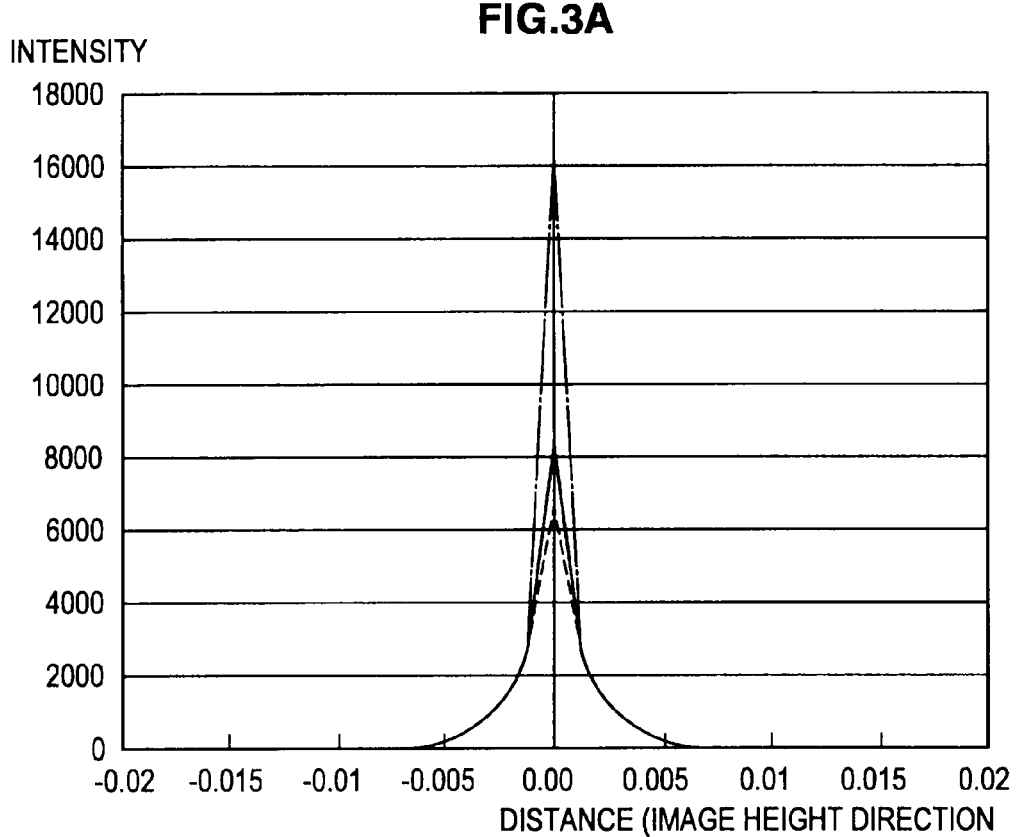
FIG. 3A is a graph showing a point spread function.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the order of the description will be as follows:
1. First embodiment
2. Second embodiment 1. First Embodiment The Configuration of First Embodiment An imaging device 100 of the present embodiment can be applied not only to digital still cameras having a lens 114 that is interchangeable or non-interchangeable, but also to devices having an imaging function, such as camcorders, mobile phones and personal digital assistants (PDAs). In addition, the imaging device 100 of the present embodiment can be applied to a recording device and a processing device that processes imaging signals generated by a small camera for a TV telephone or game software that is connected to a personal computer or the like.

Further, respective processing functions of the imaging device 100, which will be described later, can be implemented either by hardware or software. In addition, image processing described in this specification is processing with respect to R, G and B data among input data (raw data) in signal processing of the imaging device 100. In the present embodiment, a case will be described in which raw data of a Bayer array is used.

First, the configuration of the imaging device 100 according to the present embodiment will be described. FIG. 1 is a block diagram showing the imaging device 100 according to the present embodiment.

The imaging device 100 shown in FIG. 1 is a video camera that can record video data in a recording medium. The imaging device 100 includes, for example, an image sensor 101, a pre-processing portion 102, a camera signal processing portion 103, a conversion processing portion 104, a compression/expansion portion 105, a memory control portion 106, a memory 107, a display processing portion 108, a compression/expansion portion 109, a recording device control portion 110, a recording device 111, a display portion 112, a control portion 113, and the imaging lens 114.

The imaging lens 114 is a group of lenses that collects incoming light from a subject and forms an image of the subject on the image sensor 101 to be described later. The coloration due to the influence of the PSF occurs due to the following reasons. The degrees of dispersion of R, G and B differ from each other due to the point image intensity distribution that is specific to the lens when light from the subject passes through the imaging lens 114. Further, image focus locations of the respective colors are misaligned because reflection indexes are different for R, G and B. Note that the PSF of the lens will be described later in detail.

The image sensor 101 converts the incoming light from the subject that has been taken in via an optical system (including, for example, the imaging lens 114, an infrared ray removing filter, an optical low-pass filter and the like) to an electric signal by photoelectric conversion. For example, a complementary metal oxide semiconductor (CMOS) imaging element is used as the image sensor 101. When the CMOS imaging element is used, a photodiode, a row/column selection MOS transistor and a signal line etc. are arranged in a two dimensional manner, and a vertical scanning circuit, a horizontal scanning circuit, a noise removing circuit, and a timing generation circuit etc. are formed. Note that a charge coupled device (CCD) may be used as the image sensor 101.

Further, the image sensor 101 reads a signal at a frame rate of 60 fields/seconds (fps) in accordance with a specification of an NTSC method, for example. The image sensor 101 may read a signal at high speed, with a frame rate of 60 fps or more, for example, 240 fps, which is four times the normal rate. The image sensor 101 incorporates a correlated double sampling (CDS) and an A/D converter, and outputs imaging data.

The pre-processing portion 102 performs optical correction processing, such as shading correction etc., on the imaging data output from the imaging sensor 101, and then outputs a digital image signal. The pre-processing portion 102 performs one-sided blur correction to be described later. The pre-processing portion 102 includes a pixel signal extraction portion, a filter processing portion, and a signal array addition portion. The pixel signal extraction portion extracts, from image data, a pixel signal array formed of pixel signals of a plurality of pixels located in an image height direction, separately for each color component. The filter processing portion applies a filter having a plurality of tap coefficients corresponding to the number of pixels in the pixel signal array to the extracted pixel signal array, and generates a correction signal array. The signal array addition portion adds the generated correction signal array to the pixel signal array, and generates a processed signal array.

Note that the plurality of tap coefficients include one reference tap coefficient having the maximum value that is applied to a pixel of interest in the pixel signal array, and negative tap coefficients having negative values that are applied to surrounding pixels around the pixel of interest located in the image height direction. Further, in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients.

The camera signal processing portion 103 applies camera signal processing, such as synchronous processing, white balance correction, aperture correction, gamma correction and YC generation, to the imaging data received from the pre-processing portion 102.

The conversion processing portion 104 performs thinning out and size adjustment in order to convert the image signal received from the camera signal processing portion 103 to have a frame rate and a screen size suitable for display on the display portion 112. Note that the thinning out is performed when outputting the image signal to the display processing portion 108. The term "thinning out" means that, when the imaging device 100 is in a high speed imaging mode, fields are thinned out to match the number of fields in a unit time (60 fps, for example) defined by a display standard for display devices that display images.

The compression/expansion portion 105 performs compression encoding processing on the imaging data received from the conversion processing portion 104, using a still image encoding method conforming to, for example, the Joint Photographic Experts Group (JPEG) standard. Further, the compression/expansion portion 105 performs expansion decoding processing on the encoded data of the still image supplied from the memory control portion 106. The memory control portion 106 controls writing and reading of image data to and from the memory 107. The memory 107 is a first-in first-out (FIFO) buffer memory, such as a synchronous dynamic random access memory (SDRAM) or the like, and temporarily stores the image data received from the memory control portion 106.

The display processing portion 108 generates an image signal for displaying an image on the display portion 112, based on the image signal received from the conversion processing portion 104 or the compression/expansion portion 109, and transmits the generated image signal to the display portion 112, which displays the image. The display portion 112 is formed of, for example, a liquid crystal display (LCD), and displays a camera through image that is imaged in real time, an image of the data stored in the recording device 111, and the like.

The compression/expansion portion 109 performs compression encoding processing on the image data received from the conversion processing portion 104, using a moving image encoding method conforming to, for example, the Moving Picture Experts Group (MPEG). Further, the compression/expansion portion 109 performs expansion decoding processing on the encoded data of the moving image supplied from the recording device 111, and outputs the resultant data to the display processing portion 108. The display portion 112 displays the moving image received from the display processing portion 108.

The control portion 113 is a microcomputer formed of, for example, a central processing unit (CPU), a read only memory (ROM), and a random access memory (RAM) etc. The control portion 113 performs overall control of respective structural elements of the imaging device 100, by executing a program stored in the ROM or the like.

Fringing and Magnification Chromatic Aberration

First, fringing and magnification chromatic aberration will be described. Fringing is a phenomenon in which respective colors are dispersed to surrounding pixels by PSFs (to be described later) of the respective colors as shown in FIG. 3C, and the respective colors leak in over a wide pixel range, resulting in generation of false color or color bleeding. Generally, in many cases, the false color or color bleeding that occurs when pixels are saturated is referred to as fringing.

In the case of FIG. 3C, image focus locations of R, G and B are displaced from each other. Magnification chromatic aberration is a phenomenon in which colors are displaced in this manner. More specifically, magnification chromatic aberration is a phenomenon in which image focus locations of respective colors of light passing through a lens are displaced, because of differences in indexes of refraction of the respective colors of light. In terms of the PSF, it is a phenomenon in which displacement occurs at the peak of each color as shown in FIG. 3C.

Fringing and magnification chromatic aberration occur differently depending on how a PSF specific to the lens is generated. For example, regardless of whether fringing occurs or not, magnification chromatic aberration may occur or may not occur. Additionally, fringing and magnification chromatic aberration have characteristics that their generation amounts increase as the image height increases. This is because, as can be seen from FIG. 3A, FIG. 3B and FIG. 3C, as the image height increases, the spread of the PSF is extended to a wider range, and displacement of the respective colors becomes larger. Note that the image height is a value that expresses, for example, the image position on an imaging surface of the image sensor 101 as a distance from an optical axis.

About PSF

Next, PSF will be described. FIG. 2 is an explanatory diagram illustrating a relationship between a point light source 10, the lens 114, a point image 12 on the image sensor 101, and a PSF 14.

As shown in FIG. 2, the accuracy of the optical lens is expressed using a point spread function (PSF).

The point spread function indicates a blurred state of an image that is obtained by imaging a point with an optical lens, and is a function that expresses an intensity distribution in the blurred state. In other words, the point spread function is a function that expresses how light rays spread when an ideal point image passes through an optical system.

The point indicates a Dirac delta function. In discrete signal processing, it is favorable that the magnitude when the resolution of an imaging element on an imaging surface is mapped to an object space is sufficiently small. The following mathematical expression is known:

$$a \cdot e^{-2(x/\sigma)(x/\sigma)}$$

x: distance (mm), σ: dispersion (mm), a: normalization constant

Figure 3B:
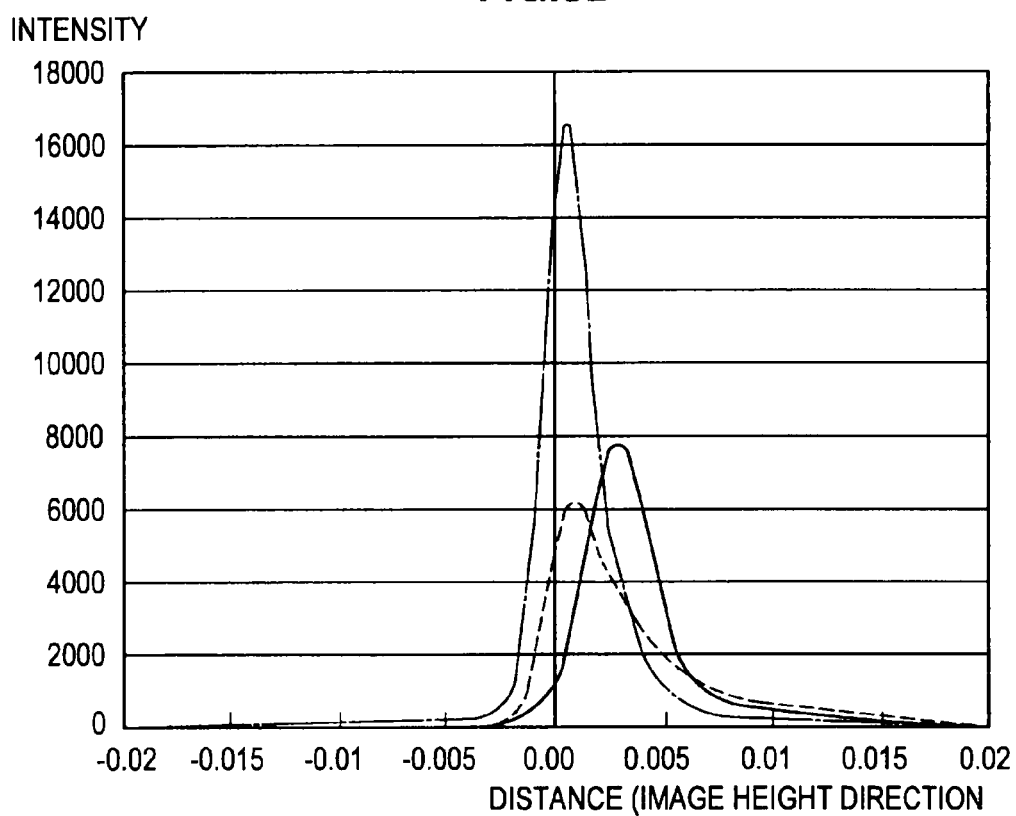
FIG. 3B is a graph showing a point spread function.
Figure 3C:
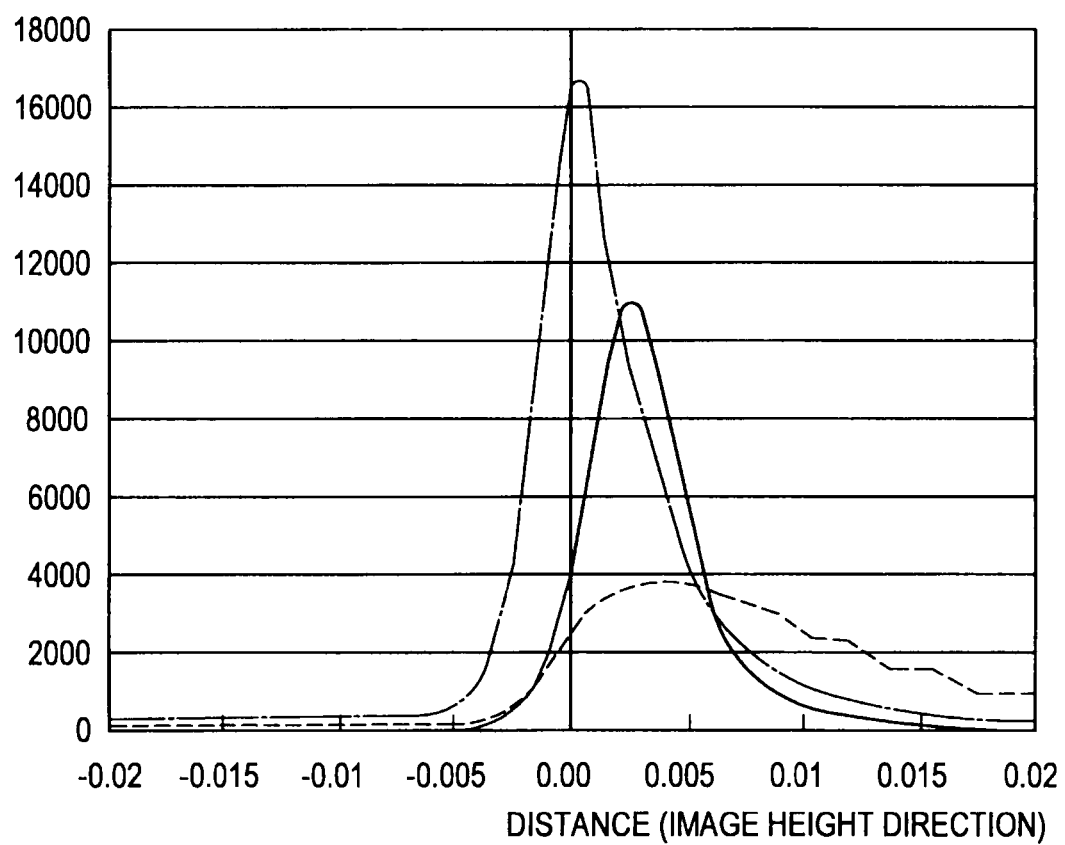
FIG. 3C is a graph showing a point spread function.
Figure 4A:
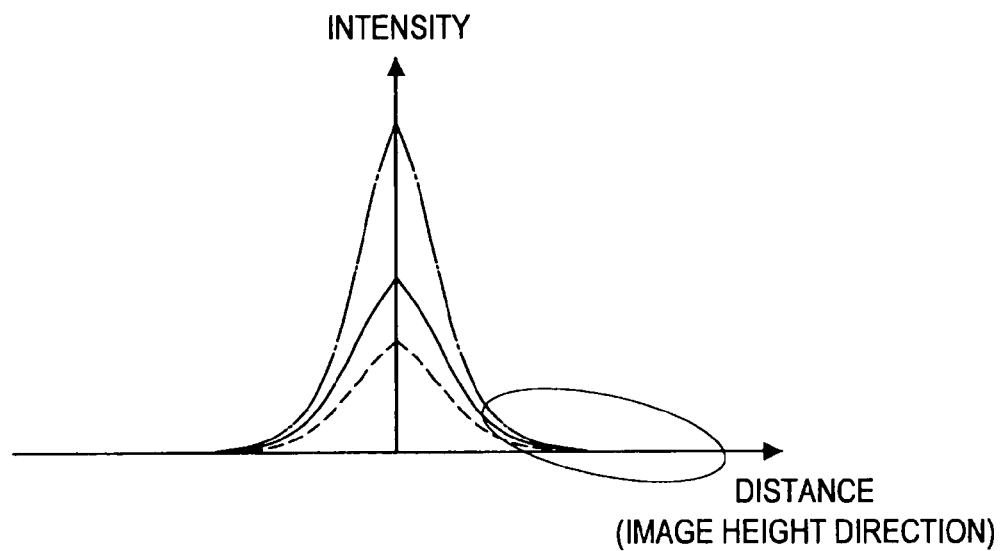
FIG. 4A is a graph showing an example of the PSF in which one-sided blur does not occur.
Figure 4B:
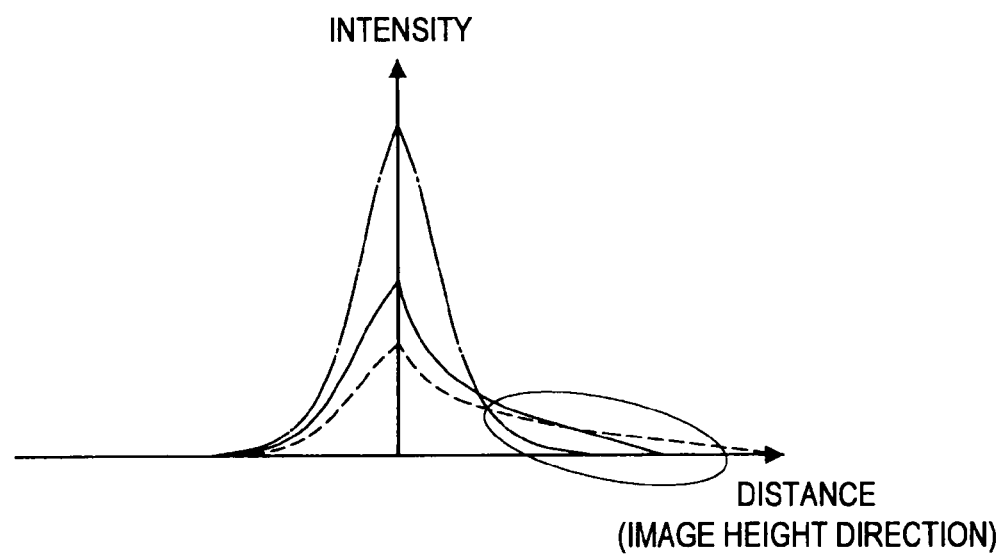
FIG. 4B is a graph showing an example of the PSF in which one-sided blur does occur.
Figure 5A:
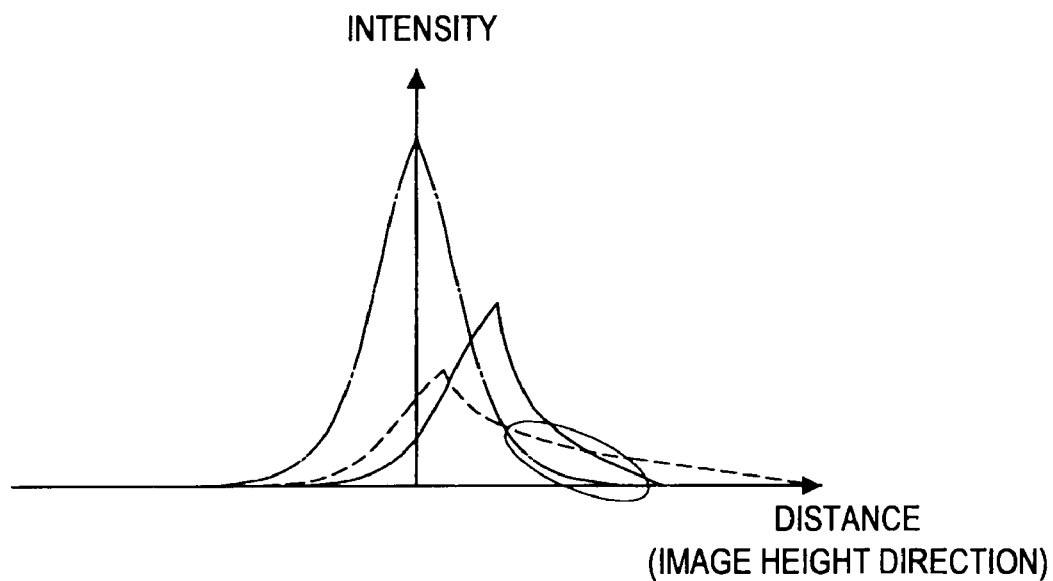
FIG. 5A is a graph showing an example of the PSF before magnification chromatic aberration correction.
Figure 5B:
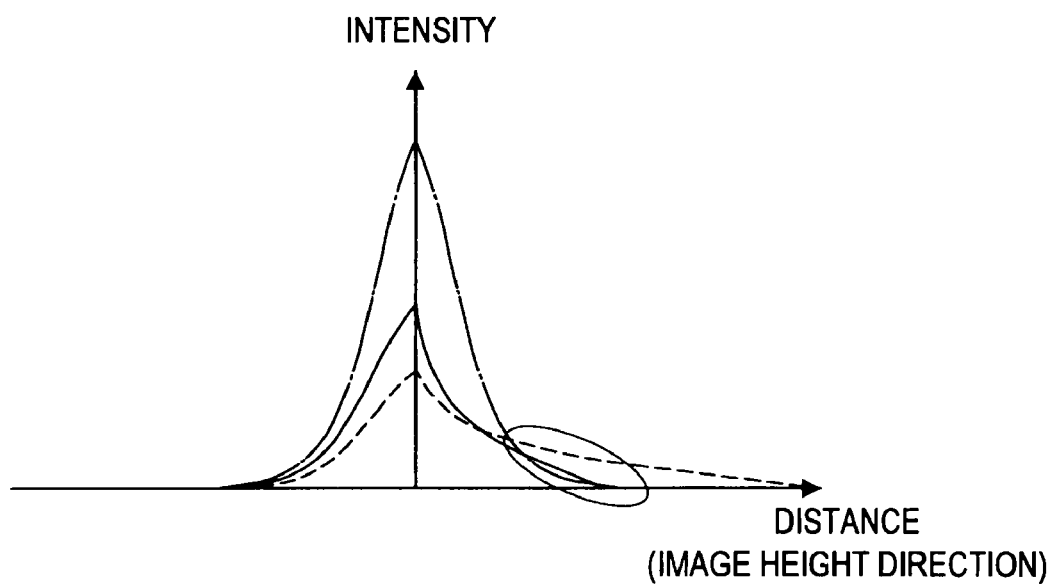
FIG. 5B is a graph showing an example of the PSF after the magnification chromatic aberration correction.

Further, as shown in FIGS. 3A to 3C, the PSF has characteristics that, as the image height increases, the degree of dispersion of the color of the image increases, and displacement of image focus locations becomes larger. FIGS. 3A to 3C show graphs each illustrating a point spread function. The graph in FIG. 3A illustrates the PSF on an optical axis, and the graph in FIG. 3B illustrates the PSF of an image height 50%. The graph in FIG. 3C illustrates the PSF of an image height 100%. The chain line indicates a green component, the solid line indicates a red component, and the broken line indicates a blue component.

The aforementioned distance x can be converted to the number of pixels if specifications of the pixel pitch and the distance from the lens etc. of the imaging element are known. Therefore, when explaining the degree of dispersion of a PSF, the aforementioned distance x will be expressed as the converted number of pixels.

Method for Reducing False Color and Coloration Caused by One-Sided Blur

Next, a method for reducing false color and coloration caused by one-sided blur, according to the present embodiment, will be described. With the method, problems caused by one-sided blur can be solved, and a similar effect to a PSF deconvolution effect can be easily obtained.

Figure 6A:
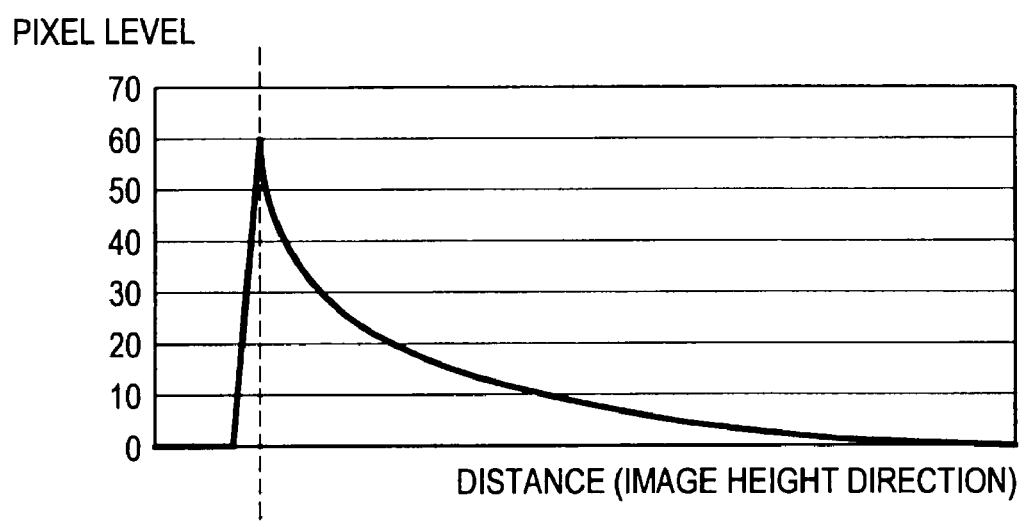
FIG. 6A is a graph showing a PSF.

For example, when correction is applied to a PSF that has the one-sided blur in the image height direction as shown in FIG. 6A, filter processing with a tap coefficient (−1 −1 −1 −1 −1 −1 −1 −1 −1 −1 −1 −1 −1 2 −1) is performed. FIG. 6A is a graph showing a PSF. The broken line in parallel with the vertical axis indicates the center position of the PSF in a given image height.

This filter processing is applied to same color pixels located in the vicinity. FIG. 12 shows an example of the filtering applied to R in pixels in a Bayer array. In this example, R14 with a twofold gain is used as a center of gravity, and a filter output is output to this pixel position. FIG. 12 is an explanatory diagram illustrating a relationship between pixels in a Bayer array and a tap coefficient.

As shown by the following expression, when this tap coefficient is used, the filter processing is performed in a range of 13 R pixels on the left and 1 R pixel on the right.

$$R1 \times (-1) + R2 \times (-1) + R3 \times (-1) + \qquad \text{Expression 1}$$
$$R4 \times (-1) + R5 \times (-1) + R6 \times (-1) + R7 \times (-1) +$$
$$R8 \times (-1) + R9 \times (-1) + R10 \times (-1) + R11 \times (-1) +$$
$$R12 \times (-1) + R13 \times (-1) + R14 \times (2) + R15 \times (-1)$$

In the example shown in FIG. 12, pixels are aligned on the horizontal line such that pixels R and pixels G are alternately arranged in the horizontal direction. The filtering according to the present embodiment is applied to pixels that are arranged in the image height direction centered on the optical axis. Therefore, the same processing is also applied in vertical and oblique image height directions. Accordingly, the arrangement of the pixels that are subjected to the filtering is not limited to the example shown in FIG. 12. FIG. 12 shows an example in which the pixels are arranged in a Bayer array in the image sensor 101. If the filtering is applied to pixels arranged in a pixel array other than a Bayer array, the filtering is applied to same color pixels in the image height direction in the same manner.

Figure 6B:
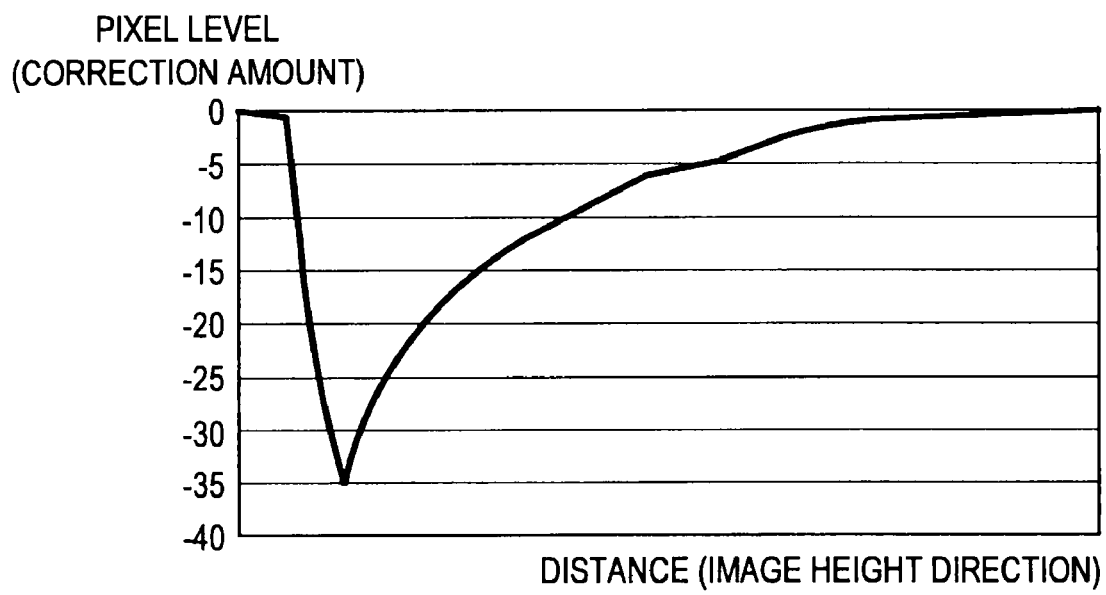
FIG. 6B is a graph showing a result after filtering.
Figure 7A:
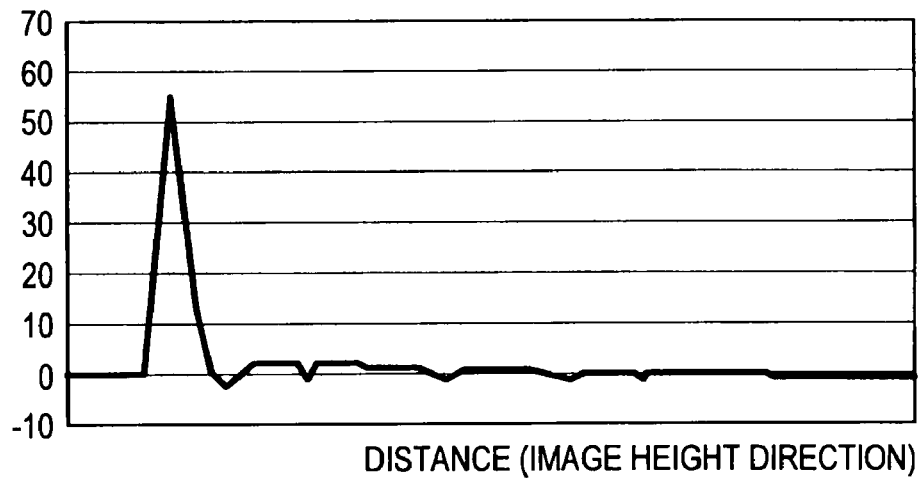
FIG. 7A is a graph showing the result of adding an original signal and the result after filtering.
Figure 7B:
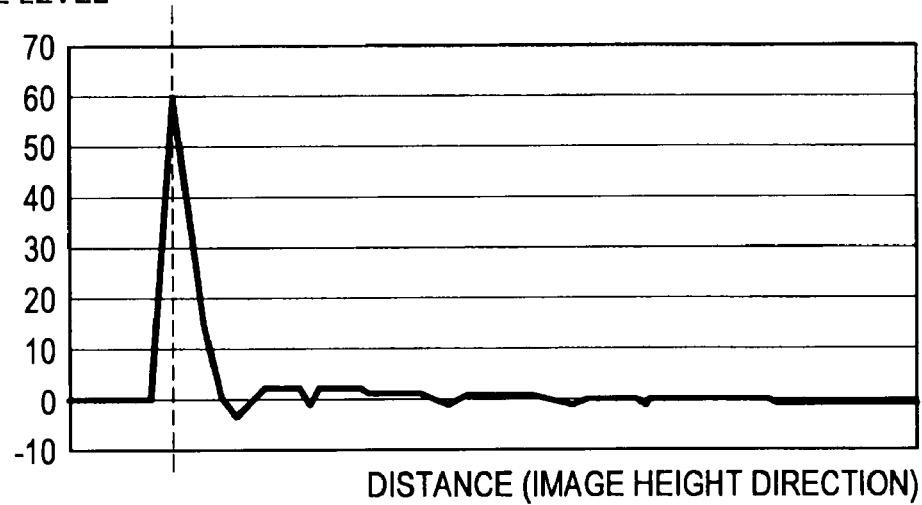
FIG. 7B is a graph showing the result of applying a gain adjustment to the graph of FIG. 7A.

FIG. 6A, and later described FIG. 6B, FIG. 7A and FIG. 7B show examples in a given image height in a given image height direction (radial direction). FIG. 6B is a graph showing a result after filtering. FIG. 7A is a graph showing the result of adding an original signal and the result after filtering. FIG. 7B is a graph showing the result of applying a gain adjustment to the graph of FIG. 7A.

If, in a given image height in a given image height direction (radial direction), the center of gravity of the above-described Expression 1 is sequentially shifted by one pixel of the same color in the image height direction (radial direction), the filtering result shown in FIG. 6B, described later, can be obtained. Generally, when smoothing such as a low-pass filter (LPF) (for example, a tap coefficient (1 2 1)) is applied, the filtering processing is performed using this tap coefficient (1 2 1) by sequentially shifting pixels in the horizontal and vertical directions of the screen. On the other hand, in the present embodiment, this pixel shift processing is performed in the image height direction (radial direction).

FIG. 6B shows the result that is obtained by applying filtering to the PSF with the one-sided blur shown in FIG. 6A, using the tap coefficient (−1 −1 −1 −1 −1 −1 −1 −1 −1 −1 −1 −1 −1 2 −1), and by normalizing the filtered PSF. Note that the center of gravity is the position at which the gain is twofold. The filter result shown in FIG. 7A is obtained by adding the filter result shown in FIG. 6B to the PSF with the one-sided blur shown in FIG. 6A. Then, if a gain adjustment is performed in order to match the gains of respective peak values of the PSF with the one-sided blur shown in FIG. 6A and the filter result shown in FIG. 7A, the final output shown in FIG. 7B is obtained.

As compared to the PSF with the one-sided blur shown in FIG. 6A, the one-sided blur is reduced in the final output shown in FIG. 7B. Thus, the result of applying pseudo deconvolution to the PSF is obtained.

This completes the description of the processing in which pseudo deconvolution is applied to the PSF. Next, filter tap coefficients will be described.

Generally, an edge correction filter is used for waveform shaping. Although there are various tap coefficients, a tap coefficient (−1 2 −1), for example, is generally used. In an edge correction that uses such a high-pass filter, a filtering result with respect to an original signal is output as an edge enhancement signal of the original signal.

On the other hand, in the above-described filter processing, the filtering result obtained by using the tap coefficient (−1 −1 −1 −1 −1 −1 −1 −1 −1 −1 −1 −1 −1 2 −1) is not output as an edge enhancement signal. The filtering result is output as a negative signal such as that shown in FIG. 6B, which changes the acutance of the waveform when the negative signal is added (added back) to the original signal, in accordance with the width of the negative coefficients (i.e., the number of the consecutive negative coefficients) of the tap coefficient.

A difference between the filtering results obtained by using the tap coefficient (−1 −1 −1 −1 −1 −1 −1 −1 −1 −1 −1 −1

Figure 8A:
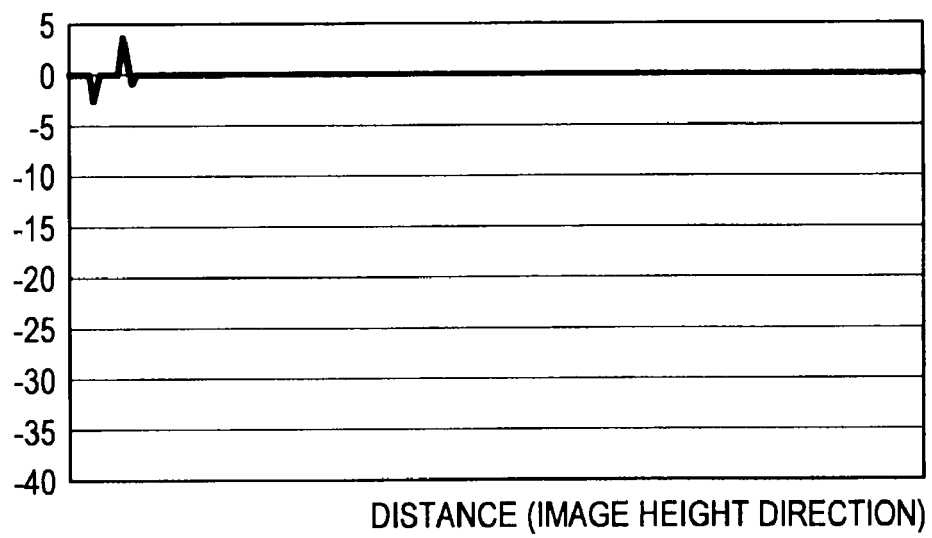
FIG. 8A shows the result obtained by applying filtering to the PSF with one-sided blur shown in FIG. 6A using a tap coefficient (−1 2 −1), and normalizing the filtered PSF.
Figure 8B:
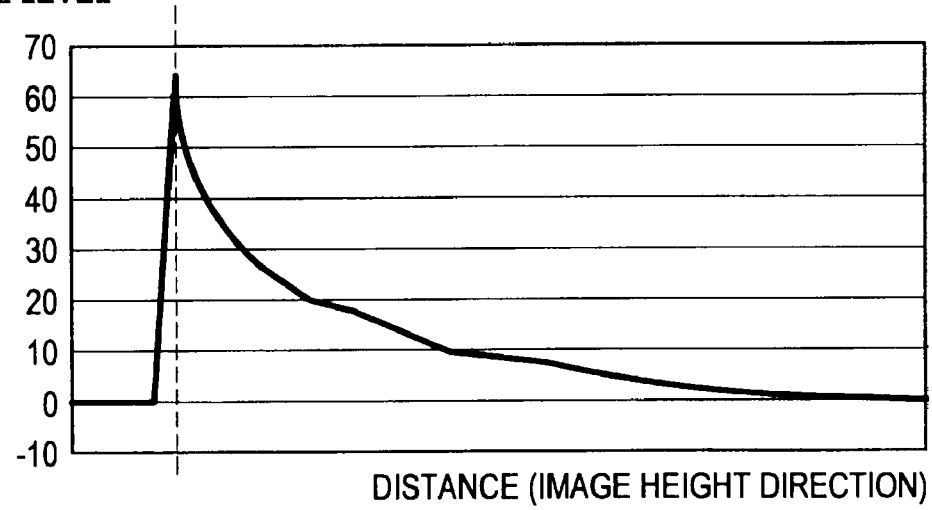
FIG. 8B shows the filter result obtained by adding (by adding back) the filter result shown in FIG. 8A to the PSF with one-sided blur shown in FIG. 6A.

2 −1) and the tap coefficient (−1 2 −1) can be explained with reference to FIG. 6A, FIG. 8A and FIG. 8B. FIG. 8A shows the result obtained by applying filtering to the PSF with the one-sided blur shown in FIG. 6A using the tap coefficient (−1 2 −1), and normalizing the filtered PSF. FIG. 8B shows the filter result obtained by adding (by adding back) the filter result shown in FIG. 8A to the PSF with the one-sided blur shown in FIG. 6A. The latter is only a normal edge correction, and only responds to high frequency components. Meanwhile, the former is a one-sided blur correction that reduces the area in which the one-sided is generated.

In the filtering using the tap coefficient (−1 −1 −1 −1 −1 −1 −1 −1 −1 −1 −1 −1 −1 2 −1), filter subtraction is performed using more pixels on the left side of the center of gravity by the width of the negative coefficients. Accordingly, a subtraction amount of the pixels on the right side of the center of gravity is larger than that of the pixels on the left side of the center of gravity, in the shape of the one-sided blur shown in FIG. 6A. Thus, the shape of the one-sided blur shown in FIG. 6A can be modified to the shape shown in FIG. 7A.

Figure 9A:
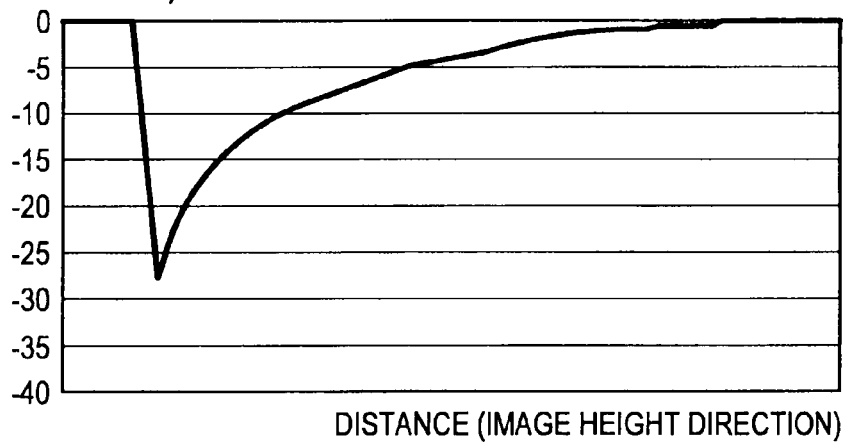
FIG. 9A is a graph showing a result after filtering.
Figure 9B:
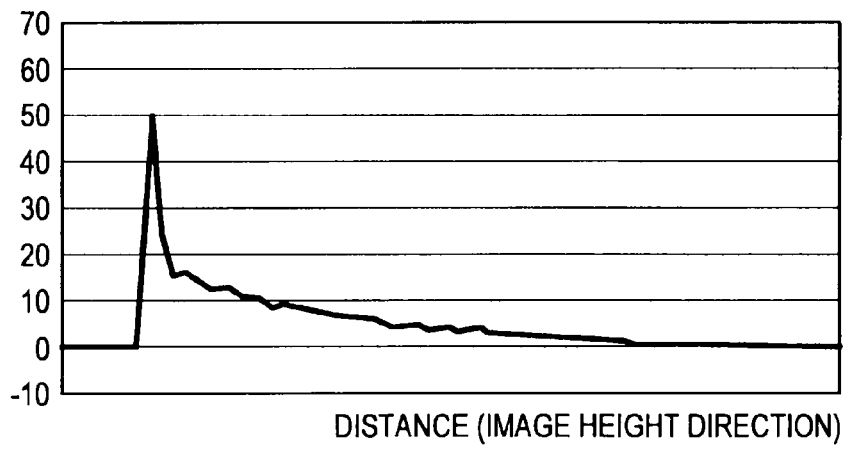
FIG. 9B is a graph showing the result of adding an original signal and the result after filtering.
Figure 9C:
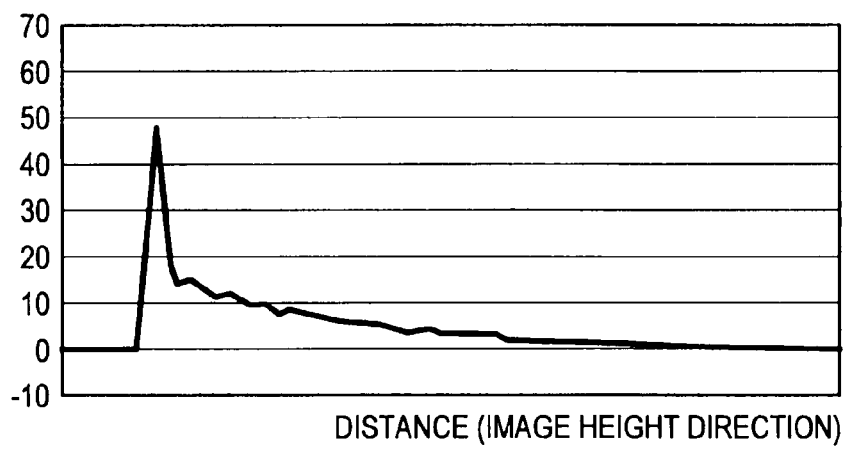
FIG. 9C is a graph showing the result of applying a gain adjustment to the graph shown in FIG. 9B.

Further, when the width of the negative coefficients of the tap coefficient varies, the subtraction amount of the pixels in the area of the one-sided blur varies. Hereinafter, a description will be made referring to FIGS. 9A to 9C. FIG. 9A is a graph showing a result after filtering. FIG. 9B is a graph showing the result of adding an original signal and the result after filtering. FIG. 9C is a graph showing the result of applying a gain adjustment to the graph shown in FIG. 9B.

An example of filtering processing that uses a tap coefficient (−1 −1 −1 −1 −1 2 −1) will be described, which is performed, for example, when correction is applied to the PSF with the one-sided blur in the image height direction as shown in FIG. 6A. FIG. 9A is the result obtained by applying the filtering using the tap coefficient (−1 −1 −1 −1 −1 2 −1) to the PSF, and normalizing the filtered PSF.

The filter result shown in FIG. 9B is obtained by adding (by adding back) the filter result shown in FIG. 9A to the PSF with the one-sided blur shown in FIG. 6A. Then, if a gain adjustment is performed in order to match the gains of respective peak values of the PSF with the one-sided blur shown in FIG. 6A and the filter result shown in FIG. 9B, the final output shown in FIG. 9C is obtained.

As compared to the PSF with the one-sided blur shown in FIG. 6A, the one-sided blur is reduced in the final output shown in FIG. 9C. Thus, the result of applying pseudo deconvolution to the PSF is obtained. However, in comparison to the graph of FIG. 7B that is obtained when the width of the negative tap coefficients is long and the graph of FIG. 9C that is obtained when the width is short, the pseudo deconvolution effects are different from each other.

The results obtained by using the tap coefficient (−1 −1 −1 −1 −1 −1 −1 −1 −1 −1 −1 −1 −1 2 −1) and the tap coefficient (−1 −1 −1 −1 −1 2 −1) are different from each other, because of the difference in the width of the negative coefficients of the tap coefficients. It is found that the former having a larger width of the negative coefficients of the tap coefficient exhibits a larger pseudo deconvolution effect, and the latter having a smaller width of the negative coefficients of the tap coefficient exhibits a smaller pseudo deconvolution effect.

Figure 10:
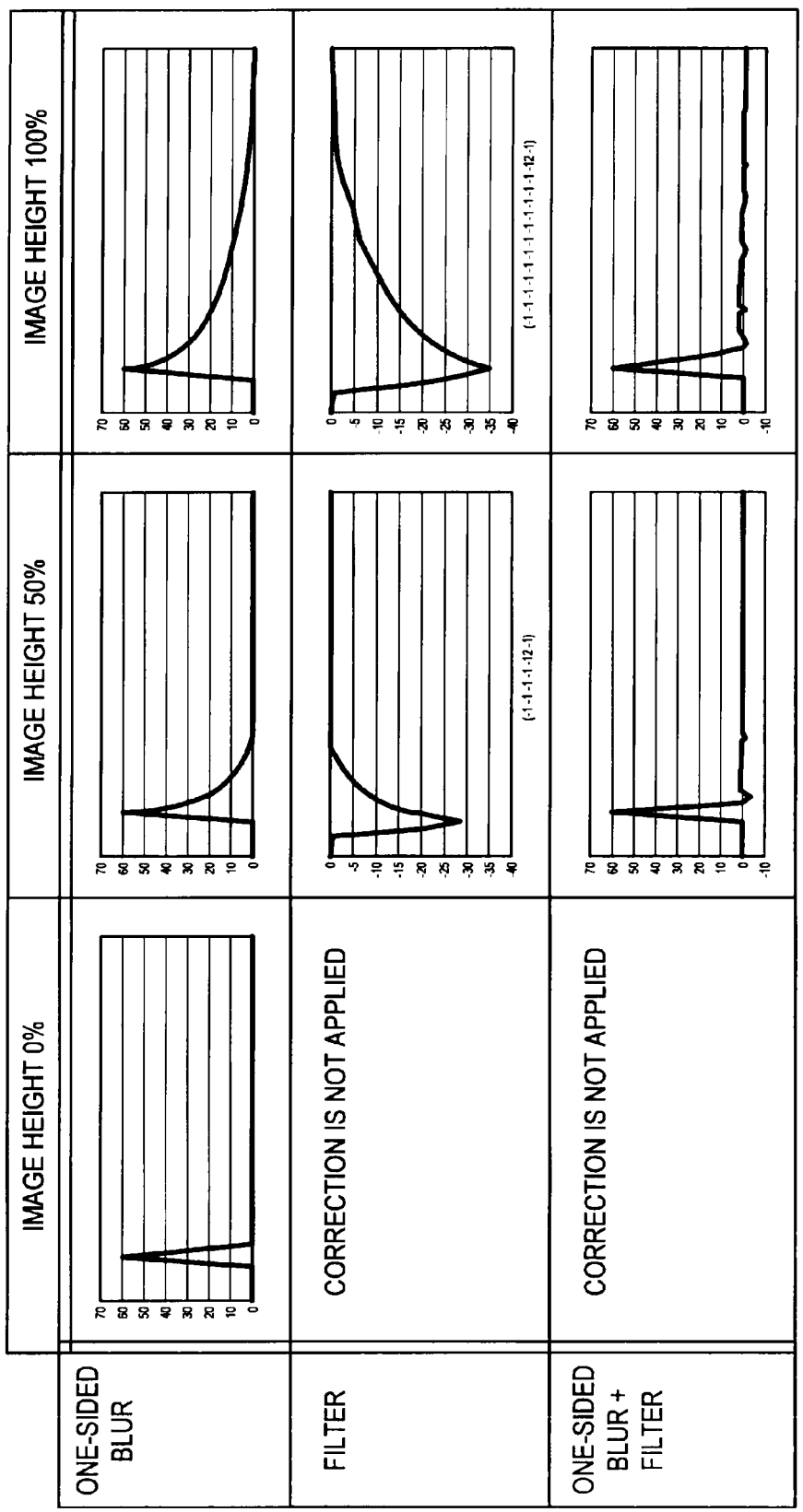
FIG. 10 is an explanatory diagram illustrating a relationship between image height and one-sided blur, and respective filter results.
Figure 11:
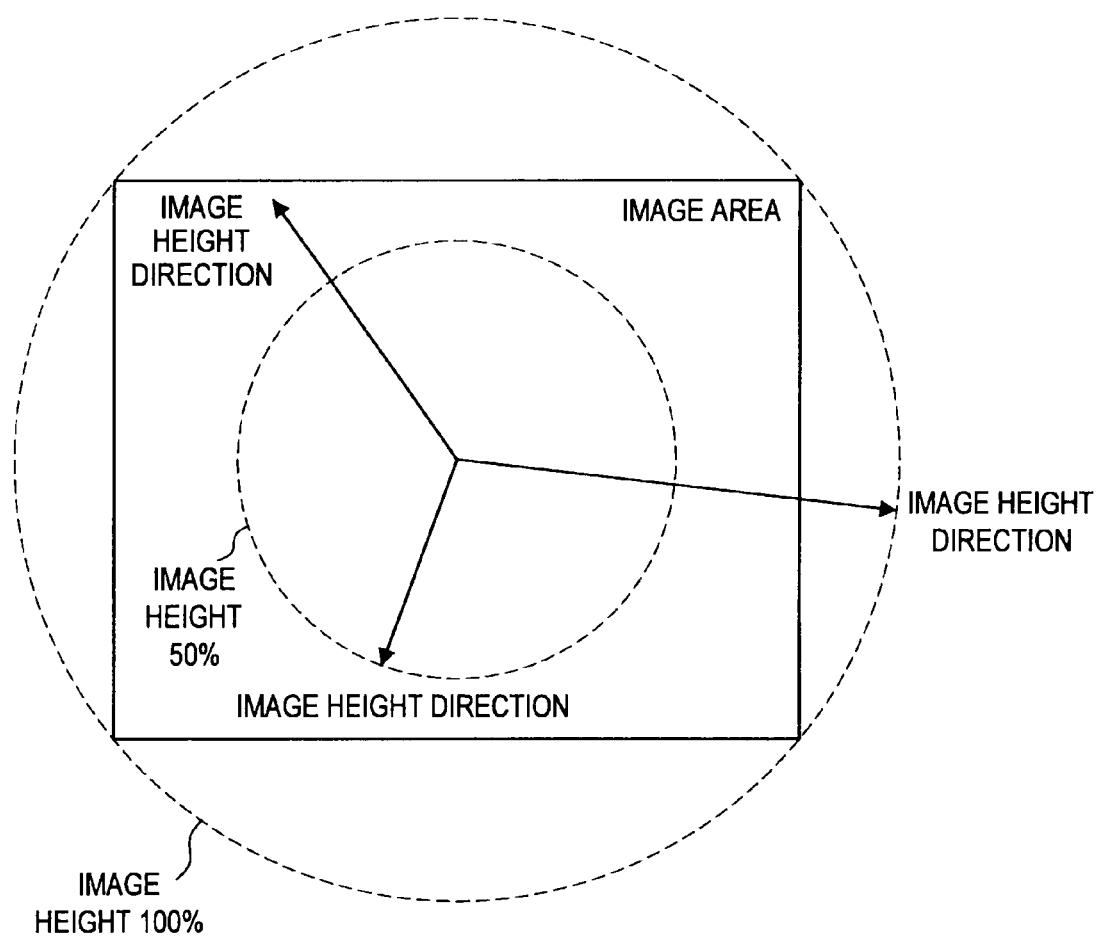
FIG. 11 is an explanatory diagram illustrating the image height in FIG. 10.

Further, the characteristics of the way in which the one-sided blur appears are different for each lens. However, generally, the degree of the one-sided blur increases or decreases depending on the image height, as shown in FIG. 3A, FIG. 3B and FIG. 3C. Therefore, as the image height increases, the width of the negative tap coefficients is increased, and as the image height decreases, the width of the negative tap coefficients is decreased. In this manner, by changing the width depending on the image height, the one-sided blur is corrected. The outline of the correction is shown in FIG. 10 and FIG. 11. FIG. 10 is an explanatory diagram illustrating a relationship between image height and one-sided blur, and respective filter results. FIG. 11 is an explanatory diagram illustrating the image height in FIG. 10.

FIG. 10 shows a manner in which the one-sided blur increases as the image height increases, and a manner in which the PSF with the one-sided blur is corrected using a filter coefficient that is changed corresponding to the image height. The filter coefficient is changed such that the length of the width of the negative coefficients is changed corresponding to the image height. Because the degree of the one-sided blur increases as the image height increases, if the length of the width of the negative coefficients is increased as the image height increases, it is possible to appropriately correct the one-sided blur corresponding to the image height.

Note that the correction is not performed at image height 0% (i.e., at the optical axis center). Further, it is assumed that the width of the negative coefficients is at a minimum, and the negative coefficients are symmetrically arranged in the image height direction (for example, (−1 2 −1) etc.). In addition, the length of the width of the negative coefficients of the filter in each image height is not fixed to the example of the present embodiment, and may be changed appropriately according to the degree of one-sided blur of the PSF with characteristics specific to a lens.

In the above, the image height 0%, the image height 50% and the image height 100% are used as an example. However, actually, the PSF continuously changes according to characteristics specific to a lens between the image height 0% and the image height 100%. Therefore, it is favorable that PSF information is stored in a storage element such as a ROM, and the PSF information is checked for each image height to determine the length of the width of the negative coefficients of a filter that corresponds to the above-described degree of one-sided blur. However, it is not realistic to store all the consecutive PSFs, due to constraint of the capacity of the storage element. Therefore, generally, PSFs are stored at storage points of, for example, the image height 0%, 20%, 30%, 40%, 50%, 60%, 70%, 80%, 90%, and 100%, and interpolation is used to obtain the information about the areas between the storage points. Alternatively, it is also acceptable that PSFs at dispersed points are stored by appropriately changing storage points such that a fine resolution is used in an area with a large change and a rough resolution is used in an area with a small change, and that interpolation is used to obtain the information about the areas between the storage points.

Further, even when the image height is the same, the one-sided blur correction may be switched ON and OFF at a given position, by switching the setting of whether this filter processing is applied or not. This also enables a correction that targets a limited area, and it is possible to perform blur correction only in a particular image area.

The above-described PSF correction is performed at each image height, such that PSFs with characteristics that are different for each color of R, G and B are matched.

For example, if FIG. 3C is taken as an example, one-sided blur of a blue component (B) is conspicuous compared to that of the other color components. Therefore, the one-sided blur of the blue component (B) is corrected to the degree of dispersion of the PSFs of the other color components. Generally, one-sided blur is unlikely to occur in the PSF of the green component (G) as compared to the PSFs of the other color components. Accordingly, the correction is performed using the green component (G) as the reference, such that the PSFs of the other color components match the degree of dispersion of the PSF of the green component (G).

Alternatively, when the PSF of the green component (G) also has one-sided blur in the same manner as the other color components, the uncorrected G is not used as the reference. First, a correction that improves acutance from a widely spread (distorted) state is applied to G to be used as the reference. Then, the degree of dispersion of R and B is corrected using the corrected G as the reference. Thus, effects of the correction can be improved.

In all the examples described above, the length of the width of the negative coefficients of each filter is only an example, and the length is not limited to such examples. An optimum solution for the length of the width of the negative coefficients of each filter varies depending on the degree of one-sided blur of the PSF that is specific to the lens. Note that the degree of one-sided blur varies depending not only on the type of the lens, but also depending on a lens state, such as an image height and an aperture state (iris position of the camera), a focus state, a zoom state, and the like.

Figure 13A:
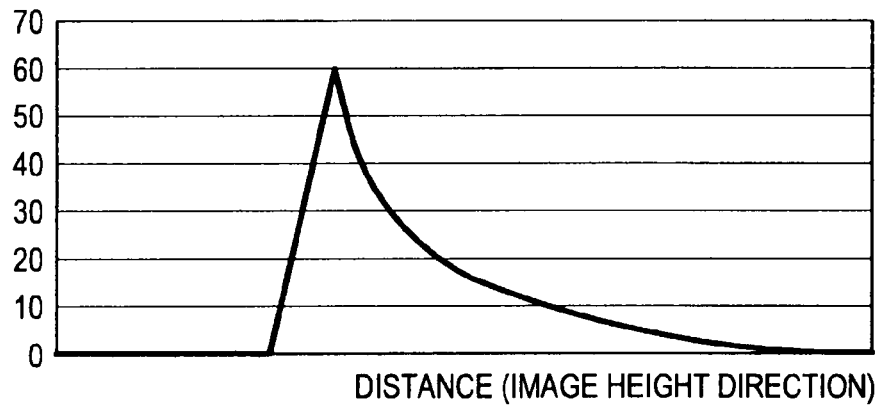
FIG. 13A is a graph showing a PSF.
Figure 13B:
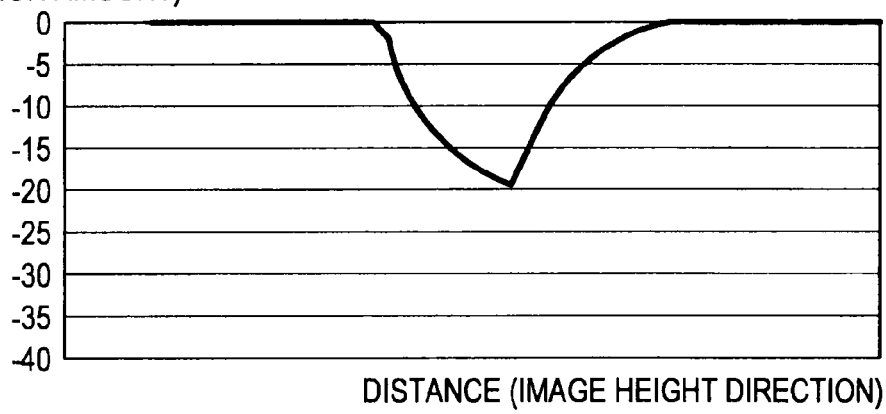
FIG. 13B is a graph showing a result after filtering.
Figure 13C:
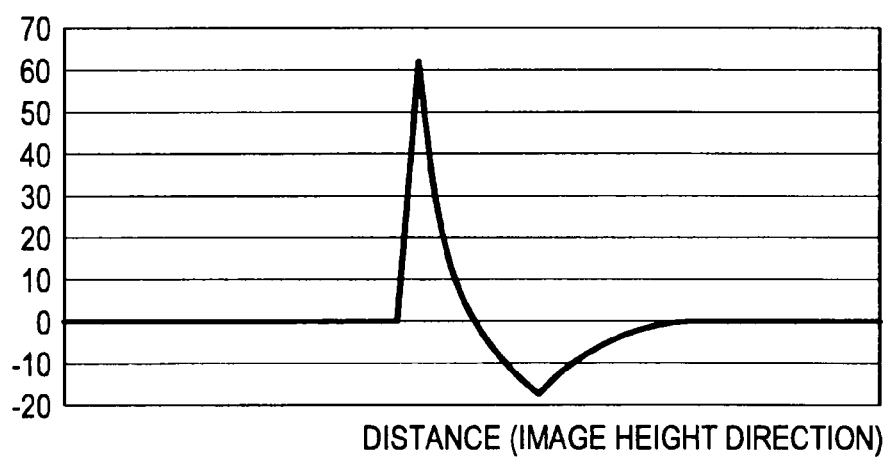
FIG. 13C is a graph showing the result of adding an original signal and the result after filtering.

Note that, if the filter coefficient is not changed corresponding to the degree of one-sided blur of the PSF, an excessive correction may be applied (i.e., the PSF may be changed excessively) in some cases. Therefore, it is necessary to change the filter coefficient in accordance with a PSF state. FIG. 13A is a graph showing a PSF. FIG. 13B is a graph showing a result after filtering. FIG. 13C is a graph showing the result of adding an original signal and the result after filtering.

For example, although an extreme example, it could be assumed that a filter having a long length of the width of negative coefficients, such as a filter having a tap coefficient (−1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 −1 2 −1), is used for the PSF with the degree of one-sided blur shown in FIG. 13A. In this case, the filtered and normalized result shown in FIG. 13B is obtained. Then, if the filter result shown in FIG. 13B is added (added back) to the PSF with the one-sided blur shown in FIG. 13A and a gain adjustment is applied to the resultant PSF, the final output shown in FIG. 13C is obtained. In this case, an excessive correction has been made. Consequently, data with a large negative value (undershoot) is present in the result obtained by adding the input (FIG. 13A) and a correction signal (FIG. 13B). In order to avoid such excessive correction, it is necessary to appropriately change the length of the width of the negative coefficients of the filter, in accordance with the degree of one-sided blur of the PSF that is specific to the lens.

As described above, according to the first embodiment of the present embodiment, it is possible to inhibit coloration (fringing etc.) from occurring due to the influence of the PSF. Further, it is possible to inhibit the color of the coloration that occurs before or after the magnification chromatic aberration from changing. In addition, in the image height direction, the distribution in which the coloring and acutance appear differently on the left and right sides of the center of gravity can be modified to a uniform distribution on the left and right sides in any area on the screen. Moreover, without performing computation with an excessively large processing volume, such as deconvolution, a pseudo-correction can easily be applied to the PSF.

2. Second Embodiment

Next, an imaging device 200 according to a second embodiment of the present invention will be described. The configuration of the imaging device 200 according to the present embodiment is the same as that of the imaging device 100 of the first embodiment, except the pre-processing portion 102. Therefore, a detailed description of the imaging device 200 is omitted.

Note that, unlike the first embodiment, the pre-processing portion 102 of the second embodiment includes, a pixel signal extraction portion, a first filter processing portion, a second filter processing portion, a signal array synthesis portion, and a signal array adding portion. The pixel signal extraction portion extracts from image data a pixel signal array formed of pixel signals of a plurality of pixels located in an image height direction, separately for each color component. The first filter processing portion applies a first filter having a plurality of tap coefficients corresponding to the number of pixels in the pixel signal array to the extracted pixel signal array, and generates a first correction signal array. The second filter processing portion applies a second filter having a plurality of tap coefficients corresponding to the number of pixels in the pixel signal array to the extracted pixel signal array, and generates a second correction signal array. The signal array synthesis portion synthesizes the first correction signal array and the second correction signal array, and generates a synthesized correction signal array. The signal array addition portion adds the generated synthesized correction signal array to the pixel signal array, and generates a processed signal array.

The plurality of tap coefficients of each of the first filter and the second filter include one reference tap coefficient having the maximum value that is applied to a pixel of interest in the pixel signal array, and negative tap coefficients having negative values that are applied to surrounding pixels around the pixel of interest located in the image height direction. Further, in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients. The position at which the reference tap coefficient of the first filter is positioned off center, and the position at which the reference tap coefficient of the second filter is positioned off center are on opposite sides.

The spread (PSF distortion) in the flared portion of the PSF shape results in image blur. If an optical design intends to create a high performance lens that produces less blur by reducing the PSF distortion, a certain lens size has to be secured. Therefore, downsizing of the lens has been difficult. Moreover, in the related art, a focus lens is moved back and forth when implementing autofocus or manual focus. However, this requires a lens moving space, and a drive mechanism of the focus lens is a factor of hindering a large downsizing of a lens block.

To address these problems, for the former, if the PSF is corrected by signal processing, it is possible to reduce the PSF distortion and prevent image blur. Further, for the latter, if the PSF is corrected to have an acuminate shape by signal processing, it is possible to eliminate the drive mechanism of the focus lens. However, in the related art, a way of correcting PSF distortion has been proposed using a deconvolution method such as that described in Japanese Patent Application Publication No. JP-A-2000-92318. Further, Japanese Patent Application Publication No. JP-A-2003-18407 discloses a technology that removes color bleeding in an image edge portion.

However, in the image blur correction method (deconvolution method) described in, for example, Japanese Patent Application Publication No. JP-A-2000-92318, it is not proposed that the correction is realized by hardware or the like due to the processing volume being too large, and problems in terms of the operation volume and the processing time that make it unrealistic to perform the correction using hardware or the like. Further, in documents other than JP-A-2000-92318 do not include discussion about realizing the image blur correction using hardware or the like. More specifically, existing literature does not include any discussion focusing attention on individual pixels, and considering which pixels should be processed and how using hardware or software in order to correct image blur.

Further, with the approximate edge enhancement processing described in Japanese Patent Application Publication No. JP-A-2003-18407, a specific filter coefficient is not disclosed. If a general edge enhancement filter coefficient (−1, 2, −1), for example, is used, bleeding between different colors can be reduced, but the PSF distortion cannot be corrected. Therefore, the image blur correction is not achieved.

In the present embodiment, it is possible to reduce the image blur such as that described above, by performing the PSF correction. According to the present embodiment, a similar effect to the PSF deconvolution effect can be easily obtained by signal processing.

The PSF correction described here is applied separately to the left and right sides in the image height direction, centered on the peak of the PSF. When blur occurs on both sides, the degree of the left side blur is different from the degree of the right side blur due to characteristics of the lens. Therefore, generally, the processing is applied separately to the left and right side blurs.

The basic processing applied to blurs on both sides is the one-sided blur correction. The one-sided blur correction is the same as that of the first embodiment, in which the correction is applied to the PSF with one-sided blur in the image height direction as shown in FIG. 6A. Therefore, a detailed description is omitted here. The final output shown in FIG. 7B is obtained by applying the one-sided blur correction. In comparison with the PSF with the one-sided blur shown in FIG. 6A, the one-sided blur is reduced in the final output shown in FIG. 7B. Thus, the result of applying pseudo deconvolution to the PSF is obtained.

Next, an example of correction of blurs on both sides such as that shown in FIG. 14A will be explained based on the one-sided blur correction. FIG. 14 A is a graph showing a PSF. FIG. 14B and FIG. 14C are graphs each showing a result after filtering. First, a filter having a tap coefficient (−1 −1 −1 −1 −1 −1 −1 −1 2 −1) is applied in the same manner as in the one-sided blur correction of the first embodiment. As a result of applying this filter, a right side blur correction signal shown in FIG. 14B is generated. Further, a filter having a tap coefficient (−1 2 −1 −1 −1 −1 −1 −1 −1 −1) is applied in the same manner as in the one-sided blur correction of the first embodiment. As a result of applying this filter, a left side blur correction signal shown in FIG. 14C is generated.

Next, the right side blur correction signal shown in FIG. 14B and the left side blur correction signal shown in FIG. 14C are merged. The term "merge" used herein means that, following comparison of the two signals, the signal with the larger absolute value of the signal level is adopted. For example, when deciding which to select, of a right side blur correction signal like that shown in FIG. 14B and a left side blur correction signal like that shown in FIG. 14C in a certain pixel, the signal having the larger signal level (absolute value) is selected.

Figure 14A:
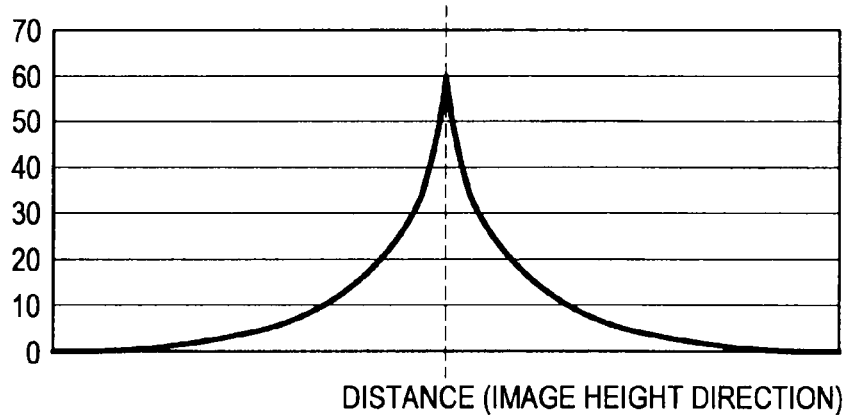
FIG. 14A is a graph showing a PSF.
Figure 14B:
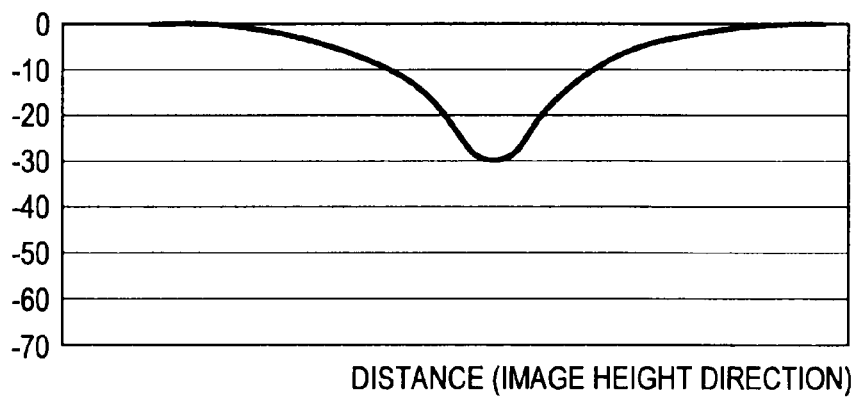
FIG. 14B is a graph showing a result after filtering.
Figure 14C:
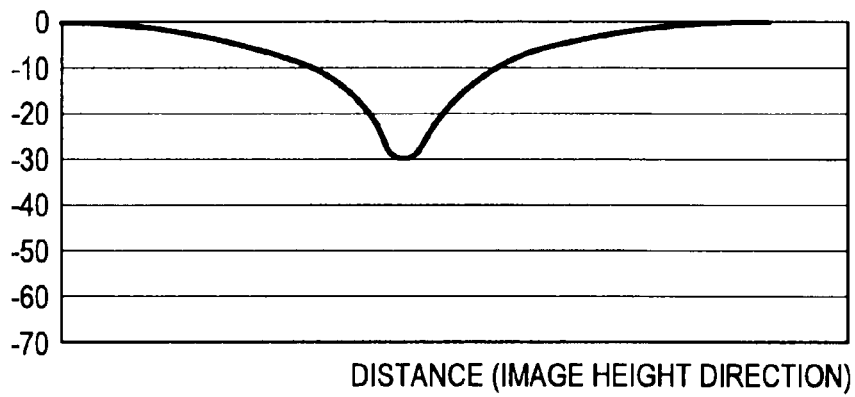
FIG. 14C is a graph showing a result after filtering.
Figure 15A:
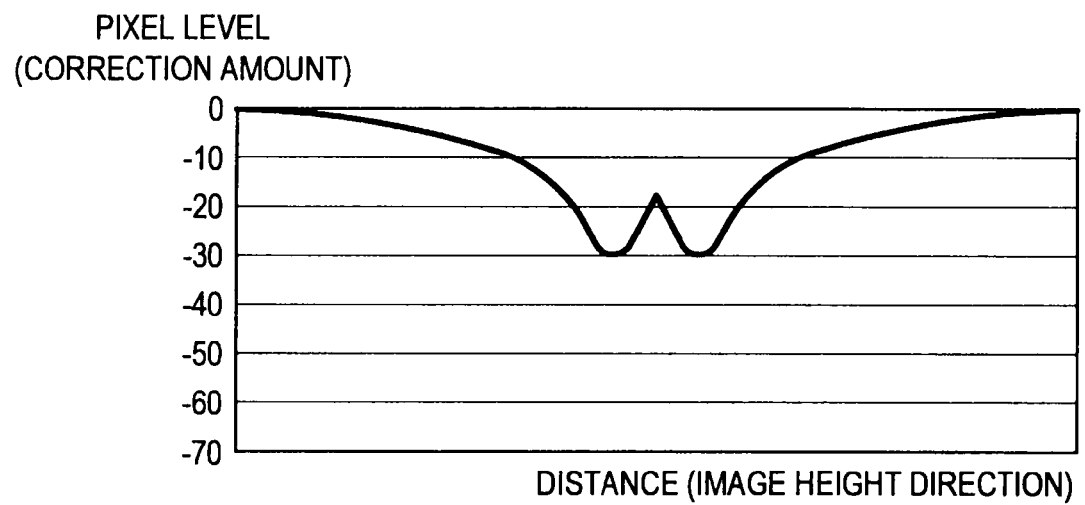
FIG. 15A is a graph showing the result of merging a right side blur correction signal shown in FIG. 14B and a left side blur correction signal shown in FIG. 14B.

At a certain pixel position, when the right side blur correction signal like that shown in FIG. 14B and the left side blur correction signal like that shown in FIG. 14C are merged, if the value of the former correction amount is −10 and the value of the latter correction amount is −50, the latter −50 is selected. FIG. 15A shows the result of performing the merge of the right side blur correction signal shown in FIG. 14B and the left side blur correction signal shown in FIG. 14C using the above-described method. FIG. 15A is a graph showing the result of performing the merge of the right side blur correction signal shown in FIG. 14B and the left side blur correction signal shown in FIG. 14C.

Figure 15B:
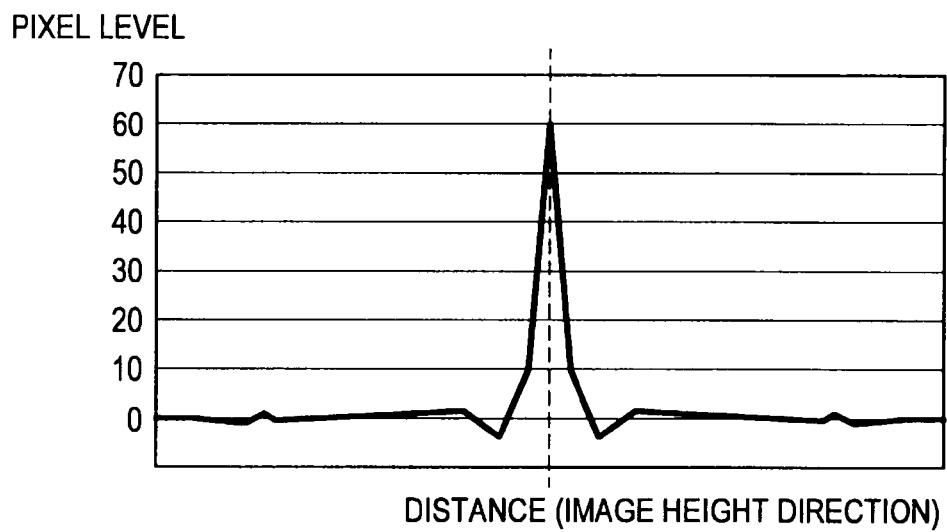
FIG. 15B is a graph showing the result of adding an original signal and the result after filtering.

Next, if the obtained correction signal shown in FIG. 15A is added to the signal having the blurs on both sides shown in FIG. 14A, the signal shown in FIG. 15B is obtained in which the blurs on both sides have been corrected. FIG. 15B is a graph showing the result of adding an original signal and the result after filtering.

This completes the description of the processing in which pseudo deconvolution is applied to the PSF. Hereinafter, filter tap coefficients will be described.

Generally, an edge correction filter is used for waveform shaping. Although there are various tap coefficients, the tap coefficient (−1 2 −1), for example, is generally used. In an edge correction that uses such a high-pass filter, a filtering result with respect to an original signal is output as an edge enhancement signal of the original signal.

On the other hand, the filtering results obtained by the filter examples (for both the left side blur and the right side blur) that are used for the PSF with the one-sided blur shown in FIG. 6A and the PSF with the blurs on both sides shown in FIG. 14A are not output as edge enhancement signals. In the above-described filter processing, the filtering result obtained by using the tap coefficient (−1 −1 −1 −1 −1 −1 −1 −1 −1 −1 −1 −1 2 −1), the filtering result obtained by using the tap coefficient (−1 −1 −1 −1 −1 −1 −1 −1 2 −1), and the filtering result obtained by using the tap coefficient (−1 2 −1 −1 −1 −1 −1 −1 −1 −1) are not output as edge enhancement signals. The filtering results are output as negative signals such as that shown in FIG. 6B, FIG. 14B and FIG. 14C, which change the acutance of the waveform when each of the negative signals is added (added back) to the original signal, in accordance with the width of the negative coefficients (i.e., the number of the consecutive negative coefficients) of each of the tap coefficients.

When blur occurs on both sides, the degree of the left side blur is different from the degree of the right side blur due to characteristics of the lens. Therefore, generally, the processing is applied separately to the left and right sides. The basic processing applied to blurs on both sides is the one-sided blur correction. Therefore, in the case of the correction for blurs on both sides, a description of the tap coefficients is the same as that in the first embodiment, and thus a detailed description is omitted.

In summary, the filter result obtained by using the tap coefficient (−1 2 −1) is only a general edge correction. However, the filter result obtained by using the tap coefficient (−1 −1 −1 −1 −1 −1 −1 −1 −1 −1 −1 −1 2 −1) of the present embodiment achieves the one-sided blur correction that reduces the area in which the one-sided is generated.

Further, when the width of the negative coefficients of the tap coefficient varies, the subtraction amount of the pixels in the area of the one-sided blur varies. The larger the width of the negative coefficients of the tap coefficient is, the larger the pseudo deconvolution effect is. Conversely, the smaller the width of the negative coefficients of the tap coefficient is, the smaller the pseudo deconvolution effect is.

Further, the characteristics of the way in which the one-sided blur appears are different for each lens. However, generally, the degree of the one-sided blur increases or decreases depending on the image height, as shown in FIG. 3A, FIG. 3B and FIG. 3C. Therefore, in the same manner as in the first embodiment, as the image height increases, the width of the negative tap coefficients is increased, and as the image height decreases, the width of the negative tap coefficients is decreased. In this manner, the one-sided blur may be corrected by changing the width depending on the image height.

Further, in the same manner as in the first embodiment, it is favorable that PSF information is stored in a storage element such as a ROM, and the PSF information is checked for each image height to determine the length of the width of the negative coefficients of a filter that corresponds to the above-described degree of one-sided blur. Further, in the same manner as in the first embodiment, even when the image height is the same, the one-sided blur correction may switched ON and OFF at a given position, by switching the setting of whether this filter processing is applied or not. This also enables a correction that targets a limited area, and it is possible to perform a blur correction only in a particular image area.

Moreover, in the same manner as in the first embodiment, the PSF correction is performed at each image height such that PSFs having characteristics that are different for each color of R, G and B are matched.

In all the examples described above, the length of the width of the negative coefficients of each filter is only an example, and the length is not limited to such examples. An optimum solution for the length of the width of the negative coefficients of each filter varies depending on the degree of one-sided blur of the PSF that is specific to the lens. Note that the degree of one-sided blur varies depending not only on the type of the lens, but also depending on a lens state, such as an image height and an aperture state (iris position of the camera), a focus state, a zoom state, and the like.

Note that, in the same manner as in the first embodiment, if the filter coefficient is not changed in correspondence with the degree of one-sided blur of the PSF, excessive correction may be applied (i.e., the PSF may be changed excessively) in some cases. Therefore, it is necessary to change the filter coefficient in accordance with a PSF state.

As described above, according to the present embodiment, it is possible to correct image blur caused by the PSF of a lens. In addition, it is also possible to selectively correct image blur in a given area on the screen. Further, even if image blur is generated asymmetrically with respect to the center of gravity in the image height direction, the blur correction that corrects the asymmetry can be performed. Moreover, without performing computation with an excessively large processing volume, such as deconvolution, a PSF with image blur can easily be corrected.

Note that the above-described image blur correction can be applied not only to improve acutance, but can also be applied to processing, for example, a focus operation. In other words, according to the present embodiment, the drive mechanism of the lens can be eliminated, and focus adjustment of a subject image can be performed by signal processing.

It should be understood by those skilled in the art that various modifications, combinations, sub-combinations and alterations may occur depending on design requirements and other factors insofar as they are within the scope of the appended claims or the equivalents thereof.

In the present embodiment, Bayer array raw data is used. However, a pixel array other than the Bayer array may be used in the same manner. More specifically, when same color pixels in the image height direction are processed, the reference position of each color is based on the pixel array other than the Bayer array.

The present application contains subject matter related to that disclosed in Japanese Priority Patent Application JP 2008-246792 filed in the Japan Patent Office on 25 Sep. 2008, the entire content of which is hereby incorporated by reference.

What is claimed is:

1. An image processing device, comprising:
   a pixel signal extraction portion that extracts from image data a pixel signal array formed of pixel signals of a plurality of pixels located in an image height direction, separately for each color component;
   a filter processing portion that applies a filter having a plurality of tap coefficients corresponding to the number of pixels in the pixel signal array to the extracted pixel signal array, and generates a correction signal array; and
   a signal array addition portion that adds the generated correction signal array to the pixel signal array, and generates a processed signal array, wherein
   the plurality of tap coefficients include one reference tap coefficient having a maximum value that is applied to a pixel of interest in the pixel signal array, and negative tap coefficients having negative values that are applied to surrounding pixels around the pixel of interest located in the image height direction,
   in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients, and,
   among the negative tap coefficients located on both sides of the reference tap coefficient in the tap coefficient array, the number of the negative tap coefficient on a first side is one, and the number of the negative tap coefficients on a second side is two or more.

2. The image processing device according to claim 1, wherein
   when a point image intensity distribution occurs with its peak at a position of the pixel of interest among the plurality of pixels located in the image height direction, and when pixel values on a first side of the pixel of interest decrease moderately compared to pixel values on a second side, among the negative tap coefficients located on both sides of the reference tap coefficient in the tap coefficient array, the number of the negative tap coefficient on a side corresponding to the first side of the pixel of interest is one, and the number of negative coefficients on a side corresponding to the second side of the pixel of interest is two or more.

3. The image processing device according to claim 2, wherein as the manner in which the pixel values decrease becomes more moderate, among the negative tap coefficients located on the both sides of the reference tap coefficient in the tap coefficient array, it is determined that the number of the negative tap coefficients on the side corresponding to the second side of the pixel of interest is increased.

4. The image processing device according to claim 1, wherein among the negative tap coefficients located on both sides of the reference tap coefficient in the tap coefficient array, the number of the negative tap coefficients on one of a first side and a second side varies corresponding to the image height.

5. An image processing device, comprising:
   a pixel signal extraction portion that extracts from image data a pixel signal array formed of pixel signals of a plurality of pixels located in an image height direction, separately for each color component;
   a first filter processing portion that applies a first filter having a plurality of tap coefficients corresponding to the number of pixels in the pixel signal array to the extracted pixel signal array, and generates a first correction signal array;

a second filter processing portion that applies a second filter having a plurality of tap coefficients corresponding to the number of pixels in the pixel signal array to the extracted pixel signal array, and generates a second correction signal array;

a signal array synthesis portion that synthesizes the first correction signal array and the second correction signal array, and generates a synthesized correction signal array; and a signal array addition portion that adds the generated synthesized correction signal array to the pixel signal array, and generates a processed signal array, wherein the plurality of tap coefficients of each of the first filter and the second filter include one reference tap coefficient having a maximum value that is applied to a pixel of interest in the pixel signal array, and negative tap coefficients having negative values that are applied to surrounding pixels around the pixel of interest located in the image height direction, and in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients, and the position at which the reference tap coefficient of the first filter is positioned off center and the position at which the reference tap coefficient of the second filter is positioned off center are on opposite sides.

6. The image processing device according to claim 5, wherein the position at which the reference tap coefficient of the first filter is positioned off center and the position at which the reference tap coefficient of the second filter is positioned off center are determined independently from each other.

7. The image processing device according to claim 5, wherein the signal array synthesis portion compares the first correction signal array and the second correction signal array and adopts one of the correction signal arrays that has a larger absolute value of a signal value, and generates the synthesized correction signal array.

8. An image processing method, comprising:

extracting from image data a pixel signal array formed of pixel signals of a plurality of pixels located in an image height direction, separately for each color component;

applying a filter having a plurality of tap coefficients corresponding to the number of pixels in the pixel signal array to the extracted pixel signal array, and generating a correction signal array; and adding the generated correction signal array to the pixel signal array, and generating a processed signal array, wherein the plurality of tap coefficients include one reference tap coefficient having a maximum value that is applied to a pixel of interest in the pixel signal array, and negative tap coefficients having negative values that are applied to surrounding pixels around the pixel of interest located in the image height direction, in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients, and, among the negative tap coefficients located on both sides of the reference tap coefficient in the tap coefficient array, the number of the negative tap coefficient on a first side is one, and the number of the negative tap coefficients on a second side is two or more.

9. An image processing method, comprising:

extracting from image data a pixel signal array formed of pixel signals of a plurality of pixels located in an image height direction, separately for each color component;

applying a first filter having a plurality of tap coefficients corresponding to the number of pixels in the pixel signal array to the extracted pixel signal array, and generating a first correction signal array;

applying a second filter having a plurality of tap coefficients corresponding to the number of pixels in the pixel signal array to the extracted pixel signal array, and generating a second correction signal array;

synthesizing the first correction signal array and the second correction signal array, and generating a synthesized correction signal array; and adding the generated synthesized correction signal array to the pixel signal array, and generating a processed signal array, wherein the plurality of tap coefficients of each of the first filter and the second filter include one reference tap coefficient having a maximum value that is applied to a pixel of interest in the pixel signal array, and negative tap coefficients having negative values that are applied to surrounding pixels around the pixel of interest located in the image height direction, and in a tap coefficient array in which the tap coefficients to be applied to the pixel signals located sequentially in the image height direction are sequentially arranged so as to correspond to the pixel signals, the reference tap coefficient is positioned off center at a position other than the center of the plurality of tap coefficients, and the position at which the reference tap coefficient of the first filter is positioned off center and the position at which the reference tap coefficient of the second filter is positioned off center are on opposite sides.

10. The image processing device according to claim 1, wherein the tap coefficient array is (−1 −1 −1 −1 −1 −1 −1 −1 −1 −1 −1 −1 −1 2 −1).

11. The image processing device according to claim 5, wherein the tap coefficient array of the first filter is (−1 −1 −1 −1 −1 −1 −1 −1 2 −1), and the tap coefficient array of the second filter is (−1 2 −1 −1 −1 −1 −1 −1 −1 −1).

* * * * *